(12) United States Patent
Qiao et al.

(10) Patent No.: US 10,919,805 B2
(45) Date of Patent: Feb. 16, 2021

(54) STRUCTURAL COMPOSITE MATERIALS

(71) Applicant: The Regents of the University of California, Oakland, CA (US)

(72) Inventors: Yu Qiao, San Diego, CA (US); Tze Han Chen, La Jolla, CA (US); Anh V. Le, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 347 days.

(21) Appl. No.: 15/747,617

(22) PCT Filed: Jul. 28, 2016

(86) PCT No.: PCT/US2016/044551
§ 371 (c)(1),
(2) Date: Jan. 25, 2018

(87) PCT Pub. No.: WO2017/019899
PCT Pub. Date: Feb. 2, 2017

(65) Prior Publication Data
US 2018/0215666 A1   Aug. 2, 2018

Related U.S. Application Data

(60) Provisional application No. 62/197,964, filed on Jul. 28, 2015.

(51) Int. Cl.
| | |
|---|---|
| *B29C 43/36* | (2006.01) |
| *B29C 43/00* | (2006.01) |
| *B29C 43/46* | (2006.01) |
| *C04B 26/28* | (2006.01) |
| *B29C 70/60* | (2006.01) |

(Continued)

(52) U.S. Cl.
CPC ............ *C04B 26/285* (2013.01); *B29C 70/60* (2013.01); *C04B 26/02* (2013.01); *C04B 26/06* (2013.01); *C04B 26/14* (2013.01); *C04B 26/18* (2013.01); *B29C 43/003* (2013.01); *B29C 43/46* (2013.01); *B29C 2043/3615* (2013.01); *Y02W 30/91* (2015.05)

(58) Field of Classification Search
None
See application file for complete search history.

(56) References Cited

U.S. PATENT DOCUMENTS

| | | | |
|---|---|---|---|
| 4,235,836 A | 11/1980 | Wassell et al. | |
| 6,083,439 A * | 7/2000 | Nastke | B01J 31/06 264/122 |

(Continued)

OTHER PUBLICATIONS

International Search Report and Written Opinion in International Application No. PCT/US2016/044551, dated Nov. 4, 2016, 18 pages.

*Primary Examiner* — Mary Lynn F Theisen
(74) *Attorney, Agent, or Firm* — Fish & Richardson P.C.

(57) ABSTRACT

The disclosure features methods of forming composite materials, and the composite materials formed by such methods. The methods include forming a mixture that includes a binder material and a filler material, and applying a pressure of at least 10 MPa to the mixture to form the composite material, where the composite material thus formed includes less than 9% by weight of the binder material, less than 18% by volume of the binder material, or both, and has a flexural strength of at least 3 MPa.

21 Claims, 32 Drawing Sheets

(51) Int. Cl.
*C04B 26/06* (2006.01)
*C04B 26/14* (2006.01)
*C04B 26/18* (2006.01)
*C04B 26/02* (2006.01)

(56) References Cited

U.S. PATENT DOCUMENTS

| | | |
|---|---|---|
| 2002/0120244 A1 | 8/2002 | Sawyer et al. |
| 2003/0065082 A1* | 4/2003 | Blanken ................ C04B 26/006 524/492 |
| 2005/0031848 A1* | 2/2005 | Wilson .................. B29C 43/003 428/323 |
| 2006/0030953 A1 | 2/2006 | Manrique et al. |
| 2006/0188726 A1 | 8/2006 | Muenz et al. |
| 2009/0181239 A1* | 7/2009 | Fan ....................... B29C 43/003 428/327 |
| 2013/0210953 A1 | 8/2013 | Kilway et al. |
| 2013/0216802 A1 | 8/2013 | Leung et al. |
| 2014/0248463 A1 | 9/2014 | Tam et al. |

* cited by examiner

STRUCTURAL COMPOSITE MATERIALS

CROSS-REFERENCE TO RELATED APPLICATIONS

This application is a National Stage application under 35 U.S.C. § 371 of International Application No. PCT/US2016/044551, having an International Filing Date of Jul. 28, 2016, which claims priority to U.S. Provisional Patent Application No. 62/197,964, filed on Jul. 28, 2015, the entire contents of which are incorporated herein by reference.

TECHNICAL FIELD

This disclosure relates to composite materials that can be used for a variety of applications and products (e.g., on-site construction, production of pre-cast structural components) and methods of making composite materials.

BACKGROUND

Materials such as stone and earth have been used for thousands of years as structural materials in construction. One of the first cements included limestones and additives such as trass and pozzolanas. In the 1800's, Portland cement was developed. Portland cement is a hydraulic material including, for example, calcium silicates, calcium oxide, silicon dioxide, aluminum oxide, ferric oxide, and calcium sulfate. Processing of these materials to form the cement involves calcination at high temperatures (e.g., about 1550° C.). Setting of the cement is accomplished in hours to days using water by means of a series of chemical reactions, with hardening over the course of a few weeks. Portland cement is used in the production of concrete when mixed with an aggregate (e.g., gravel, stone, or sand) and water.

Each year, approximately 2-4 billion tons of Portland cement are used in the world, of which approximately 80 million tons are used in the U.S. About 15% of the Portland cement is used to produce precast concrete parts. Precast parts have been widely used in construction and maintenance of buildings and transportation systems as, for example, panels, columns, supports, and pipes. Using pre-cast parts typically reduces the duration of construction projects and simplifies construction procedures.

About 4 GJ of energy is consumed to produce one ton of Portland cement, accounting for 5-10% of the entire industrial energy consumption. In addition, Portland cement production accounts for approximately 3-10% of the total human-produced atmospheric carbon dioxide.

Polymer cements can be used in many applications as a substitute for Portland cement, and have a high tensile strength in addition to a compressive strength that is comparable to or higher than Portland cement. Binders used in polymer cements function to bond together the filler material portion of the cement, and bear much of the load that the cement is subjected to when used in structural applications.

SUMMARY

The economic and environmental costs of producing structural materials such as cement is significantly attributable to the cost of the binders used in the cements. For example, polymer cements typically cost about $200 per ton to produce, of which greater than 60% of this cost is that of the binder. Yearly carbon dioxide emissions from the manufacture of polymer cement is estimated at about 450 kg per ton of polymer cement produced.

To reduce the costs—both economic and environmental—associated with producing materials suitable for structural use in construction, batteries, fabrication of pre-cast parts, and a variety of other applications, the present application discloses composite materials and methods of making such materials in which the amount of binder material in the composite is significantly reduced relative to conventional structural materials. For example, in the composite materials disclosed herein, the amount of binder material can be less than 9% by weight, less than 18% by volume, or both.

By significantly reducing the amount of binder material in the composite materials, the economic and environmental costs associated with producing structural materials can be significantly reduced. Accordingly, construction costs can be lowered, energy consumption can be reduced, and carbon dioxide emissions associated with the production of building materials such as cement can be lowered.

In addition, by applying the processing methods disclosed herein to produce the composite materials, the binder material—even when present in relatively small amounts—can be distributed among the filler material so that composite materials having relatively small amounts of binder material still have physical properties, such as relatively high flexural and compressive strength, that are favorable for use in structural and/or functional applications.

The processing methods disclosed herein are flexible and can be used to prepare composite materials featuring a wide variety of different binder materials and filler materials. For example, suitable filler materials can include recycled concrete, sand, soil, rocks, gravels, stones, bricks, metals, alloys, ceramics, glasses, functional solid or gel fillers, solid waste, carbon materials, polymers, and/or elastomers, and any components of these materials. The use of recycled waste or other repurposed materials as filler material further highlights the inherent cost-effectiveness and environmental friendliness of the methods and provides, for example, a means for developing countries to fully and efficiently utilize their existing resources.

The methods can be used to produce pre-cast structural components from the composite materials for use in construction. In addition, the methods can be used on-site to prepare composite materials for direct use in structural fabrication. The methods can be implemented using conventional equipment and infrastructure that is already in use for the production of widely used cements, concretes, and other aggregate-based materials, and also find wide applications in other industries such as food production, medicine production, battery and capacitor manufacturing, and production of artificial biomaterials. Bio-compatible filler materials and filler materials such as various glasses can be used to fabricate materials with an aesthetically pleasing appearance, which can be particularly important for biological and therapeutic applications (e.g., fabrication of bio-compatible prosthetics) and in building construction applications.

In a first aspect, the disclosure features composite materials that include a filler material and a binder material disposed between at least some units of the filler material to form a solid, integral composite material, where the composite materials include less than 9% by weight of the binder material, less than 18% by volume of the binder material, or both, and where the composite materials have a flexural strength of at least 3 MPa.

Embodiments of the composite materials can include any one or more of the following features.

The binder material can include at least one material selected from the group consisting of thermoplastic materials, thermosetting materials, elastomeric materials, polymer materials, ceramic materials, glasses, metals, alloys, salts, carbon materials, and sulfur-containing materials. The binder material can include at least one material selected from the group consisting of polyesters, polyethersulfones, polysulfones, polyetherimides, epoxies, fluoropolymers, phenolic materials, vinyl esters, carboxymethylcellulose-based materials, polyetherketones, cyclic oligomers, polymethyl methacrylates, polycarbonates, and polybutylene terephthalates.

The filler material can include at least one material selected from the group consisting of sand, soil, rocks, gravel, stones, bricks, concrete, cement, wood, metals, alloys, ceramics, polymers, composites, glasses, carbon materials, solid waste, medicine, food, electrode materials, and components thereof. The soil can include extraterrestrial soil, rocks, and/or minerals. The filler material can include units of at least one material in the form of at least one of powders, beads, dots, grains, particles, chips, cubes, layers, layer stacks, blocks, spheres, fibers, tubes, beams, pipes, rods, threads, platelets, coatings, hollow beads, hollow fibers, hollow blocks, hollow layers, bilayers, porous materials, meshes, fabrics, mats, honeycombs, and three-dimensional forms.

The composite materials can include at least one additive material selected from the group consisting of foaming agents, bubble-generating agents, solvents, and lubricants.

The composite materials can have a compressive strength of at least 10 MPa (e.g., at least 40 MPa). The composite materials can have a flexural strength of at least 5 MPa (e.g., at least 10 MPa).

At least one of the weight percentage of the binder material and the volume percentage of the binder material can vary within the composite materials. The composite materials can include a first region in which the weight percentage of the binder material has a first value, and a second region in which the weight percentage of the binder material has a second value different from the first value. The first and second values can each be less than 9%. The composite materials can include a first region in which the volume percentage of the binder material has a first value, and a second region in which the volume percentage of the binder material has a second value different from the first value. The first and second values can each be less than 18%.

The composite materials can include a first binder material, and a second binder material different from the first binder material. The second binder material can include at least one material selected from the group consisting of thermoplastic materials, thermosetting materials, elastomeric materials, polymer materials, ceramic materials, glasses, metals, alloys, salts, carbon materials, and sulfur-containing materials. The second binder material can include at least one material selected from the group consisting of polyesters, polyethersulfones, polysulfones, polyetherimides, epoxies, fluoropolymers, phenolic materials, vinyl esters, carboxymethylcellulose-based materials, polyetherketones, cyclic oligomers, polymethyl methacrylates, polycarbonates, and polybutylene terephthalates.

The composite materials can include a first filler material, and a second filler material different from the first filler material. The second filler material can include at least one material selected from the group consisting of sand, soil, rocks, gravel, stones, bricks, concrete, cement, wood, metals, alloys, ceramics, polymers, composites, glasses, carbon materials, solid waste, medicine, food, electrode materials, and components thereof.

The composite materials can include less than 5% by weight of the binder material (e.g., less than 3% by weight of the binder material). The composite materials can include less than 10% by volume of the binder material (e.g., less than 5% by volume of the binder material).

Embodiments of the composite materials can also include any of the other features disclosed herein, including combinations of features disclosed in connection with different embodiments, in any combination as appropriate.

In another aspect, the disclosure features methods of forming a composite material that include forming a mixture that includes a binder material and a filler material, and applying a pressure of at least 10 MPa to the mixture to form the composite material, where the mixture includes less than 9% by weight of the binder material, less than 18% by volume of the binder material, or both.

Embodiments of the methods can include any one or more of the following features.

The methods can include breaking the composite material into a plurality of pieces, and applying a second pressure of at least 10 MPa to the plurality of pieces. The methods can include heating the composite material to a temperature of at least 50° C.

The methods can include forming a pre-cast component including the composite material by positioning the mixture in a mold having a shape conforming to a shape of the pre-cast component, and applying the pressure to the mixture in the mold. The methods can include applying the pressure to the mixture by contacting the mixture with a compressive load.

The pressure can be applied to the mixture for a duration of at least 1 second.

The methods can include applying a second pressure of at least 10 MPa to the mixture. Each application of pressure to the mixture can include impacting the mixture with an impact member. Each application of pressure to the mixture can occur for a duration of 1 second or less. During each application of pressure to the mixture, the pressure applied to the mixture can increase from zero to a maximum pressure in a time period of 100 microseconds or less.

The pressure can be applied to the mixture by translating a pressurizing member relative to the mixture to apply the pressure to different portions of the mixture at different times. The pressurizing member can include a roller or a piston.

The mixture can include less than 5% by weight of the binder material (e.g., less than 3% by weight of the binder material, less than 1% by weight of the binder material). The mixture can include less than 10% by volume of the binder material (e.g., less than 5% by volume of the binder material).

The binder material can include at least one material selected from the group consisting of thermoplastic materials, thermosetting materials, elastomeric materials, polymer materials, ceramic materials, glasses, carbon materials, metals, alloys, salts, and sulfur-containing materials. The binder material can include at least one material selected from the group consisting of polyesters, polyethersulfones, polysulfones, polyetherimides, epoxies, fluoropolymers, phenolic materials, vinyl esters, carboxymethylcellulose-based materials, polyetherketones, cyclic oligomers, polymethyl methacrylates, polycarbonates, and polybutylene terephthalates.

The filler material can include at least one material selected from the group consisting of sand, soil, rocks, gravel, stones, bricks, metals, alloys, ceramics, polymers, composites, glasses, solid waste, medicine, food, carbon materials, electrode materials, and components thereof. The soil can include extraterrestrial soil, rocks, and/or minerals.

The filler material can include units of one or more materials in the form of at least one of powders, beads, dots, grains, particles, chips, cubes, layers, layer stacks, blocks, spheres, fibers, tubes, beams, pipes, rods, threads, platelets, coatings, hollow beads, hollow fibers, hollow blocks, hollow layers, bilayers, porous materials, meshes, fabrics, mats, honeycombs, and three-dimensional forms. The mixture can include at least one additive selected from the group consisting of foaming agents, bubble-generating agents, solvents, and lubricants.

The applied pressure can be at least 40 MPa (e.g., at least 100 MPa).

Embodiments of the methods can also include any of the other features disclosed herein, including combinations of features disclosed in connection with different embodiments, in any combination as appropriate.

In a further aspect, the disclosure features composite materials including a filler material, and a binder material disposed between at least some units of the filler material to form a solid, integral composite material, where the composite materials include less than 18% by weight of the binder material, less than 18% by volume of the binder material, or both, and where for a temperature increase of at least 20° C., an electrical resistance of the composite material increases by at least 20%.

Embodiments of the composite materials can include any one or more of the following features.

The electrical resistance of the composite materials can increase by at least 100% (e.g., by at least 1000%).

The binder material can include poly(vinylidene) fluoride. The filler material can be a first filler material including at least one of silica and montmorillonite, and the composite material can further include a second filler material including carbon black.

The binder material can include at least one material selected from the group consisting of thermoplastic materials, thermosetting materials, elastomeric materials, polymer materials, ceramic materials, glasses, metals, alloys, salts, carbon materials, and sulfur-containing materials. The binder material can include at least one material selected from the group consisting of polyesters, polyethersulfones, polysulfones, polyetherimides, epoxies, fluoropolymers, phenolic materials, vinyl esters, carboxymethylcellulose-based materials, polyetherketones, cyclic oligomers, polymethyl methacrylates, polycarbonates, and polybutylene terephthalates.

The filler material can include at least one material selected from the group consisting of sand, soil, rocks, gravel, stones, bricks, concrete, cement, wood, metals, alloys, ceramics, polymers, elastomeric materials, composites, glasses, carbon materials, solid waste, medicine, food, electrode materials, and components thereof. The filler material can include units of at least one material in the form of at least one of powders, beads, dots, grains, particles, chips, cubes, layers, layer stacks, blocks, spheres, fibers, tubes, beams, pipes, rods, threads, platelets, coatings, hollow beads, hollow fibers, hollow blocks, hollow layers, bilayers, porous materials, meshes, fabrics, mats, honeycombs, and three-dimensional forms.

The composite materials can form a portion of at least one of an electrode, a current collector, a separator, a capacitor, an electrolyte, and a housing within an electrical device.

Embodiments of the composite materials can also include any of the other features disclosed herein, including combinations of features disclosed in connection with different embodiments, in any combination as appropriate.

In another aspect, the disclosure features composite materials including a filler material, and a binder material disposed between at least some units of the filler material to form a solid, integral composite material, where the composite materials include less than 18% by weight of the binder material, less than 18% by volume of the binder material, or both, and where in response to an applied pressure of at least 0.1 MPa, an electrical resistance of the composite materials increases by at least 20%.

Embodiments of the composite materials can include any one or more of the following features.

The electrical resistance of the composite materials can increase by at least 100% (e.g., by at least 1000%).

The binder material can include poly(vinylidene) fluoride. The filler material can be a first filler material including at least one of silica and montmorillonite, and the composite materials can further include a second filler material including carbon black.

The binder material can include at least one material selected from the group consisting of thermoplastic materials, thermosetting materials, elastomeric materials, polymer materials, ceramic materials, glasses, metals, alloys, salts, carbon materials, and sulfur-containing materials. The binder material can include at least one material selected from the group consisting of polyesters, polyethersulfones, polysulfones, polyetherimides, epoxies, fluoropolymers, phenolic materials, vinyl esters, carboxymethylcellulose-based materials, polyetherketones, cyclic oligomers, polymethyl methacrylates, polycarbonates, and polybutylene terephthalates.

The filler material can include at least one material selected from the group consisting of sand, soil, rocks, gravel, stones, bricks, concrete, cement, wood, metals, alloys, ceramics, polymers, elastomeric materials, composites, glasses, carbon materials, solid waste, medicine, food, electrode materials, and components thereof. The filler material can include units of at least one material in the form of at least one of powders, beads, dots, grains, particles, chips, cubes, layers, layer stacks, blocks, spheres, fibers, tubes, beams, pipes, rods, threads, platelets, coatings, hollow beads, hollow fibers, hollow blocks, hollow layers, bilayers, porous materials, meshes, fabrics, mats, honeycombs, and three-dimensional forms.

The composite materials can form a portion of at least one of an electrode, a current collector, a separator, a capacitor, an electrolyte, and a housing within an electrical device.

Embodiments of the composite materials can also include any of the other features disclosed herein, including combinations of features disclosed in connection with different embodiments, in any combination as appropriate.

In a further aspect, the disclosure features composite materials including a filler material, and a binder material disposed between at least some units of the filler material to form a solid, integral composite material, where the composite materials at least one of: include less than 9% by weight of the binder material and have a flexural strength that is at least 20% larger than a product of a flexural strength of the binder material and a weight percentage of the binder material in the composite materials; and include less than 18% by volume of the binder material and have a flexural strength that is at least 20% larger than a product of the flexural strength of the binder material and a volume percentage of the binder material in the composite materials.

Embodiments of the composite materials can include any one or more of the following features.

The composite materials can include less than 9% by weight of the binder material and can have a flexural strength that is at least 40% larger than the product of the flexural strength of the binder material and the weight percentage of the binder material in the composite materials.

The composite materials can include less than 18% by volume of the binder material and can have a flexural strength that is at least 40% larger than the product of the flexural strength of the binder material and the volume percentage of the binder material in the composite materials.

The binder material can include at least one material selected from the group consisting of thermoplastic materials, thermosetting materials, elastomeric materials, polymer materials, ceramic materials, glasses, metals, alloys, salts, carbon materials, and sulfur-containing materials. The binder material can include at least one material selected from the group consisting of polyesters, polyethersulfones, polysulfones, polyetherimides, epoxies, fluoropolymers, phenolic materials, vinyl esters, carboxymethylcellulose-based materials, polyetherketones, cyclic oligomers, polymethyl methacrylates, polycarbonates, and polybutylene terephthalates.

The filler material can include at least one material selected from the group consisting of: sand, soil, rocks, gravel, stones, bricks, concrete, cement, wood, metals, alloys, ceramics, polymers, composites, glasses, carbon materials, solid waste, medicine, food, electrode materials, any components thereof, and any combination thereof. The filler material can include units of at least one material in the form of at least one of powders, beads, dots, grains, particles, chips, cubes, layers, layer stacks, blocks, spheres, fibers, tubes, beams, pipes, rods, threads, platelets, coatings, hollow beads, hollow fibers, hollow blocks, hollow layers, bilayers, porous materials, meshes, fabrics, mats, honeycombs, and three-dimensional forms.

The composite materials can include at least one additive selected from the group consisting of foaming agents, bubble-generating agents, solvents, and lubricants.

The composite materials can have a compressive strength of at least 10 MPa (e.g., at least 40 MPa). The composite materials can have a flexural strength of at least 5 MPa (e.g., at least 10 MPa).

Embodiments of the composite materials can also include any of the other features disclosed herein, including combinations of features disclosed in connection with different embodiments, in any combination as appropriate.

In another aspect, the disclosure features batteries that include a negative electrode, an active material layer, a membrane separator disposed between the negative electrode and the active material layer, a current collector, and a composite material layer contacting the active material layer and the current collector, where the composite material layer includes a filler material featuring at least one of ceramic materials and carbon materials, and a binder material featuring poly(vinylidene) fluoride disposed between at least some units of the filler material to form a solid, integral composite material, where the composite material layer includes 18% or less by weight of the binder material.

Embodiments of the batteries can include any of the features disclosed herein, including combinations of features disclosed in connection with different embodiments, in any combination as appropriate.

In a further aspect, the disclosure features medicaments that include a filler material featuring a digestible compound, a binder material including carboxymethylcellulose disposed between at least some units of the filler material to form a solid, integral composite material, and a pharmaceutical compound encapsulated by the composite material, where the binder material forms 9% by weight or less of the composite material.

Embodiments of the medicaments can include any of the features disclosed herein, including combinations of features disclosed in connection with different embodiments, in any combination as appropriate.

In another aspect, the disclosure features biomimicking composite materials that include a filler material featuring particles of calcium carbonate, and a binder material featuring an epoxy material disposed between at least some of the particles of calcium carbonate to form a solid, integral composite material, where the composite materials include 15% or less by weight of the binder material, and where the composite materials have a flexural strength of at least 20 MPa.

Embodiments of the biomimicking composite materials can include any of the features disclosed herein, including combinations of features disclosed in connection with different embodiments, in any combination as appropriate.

Unless otherwise defined, all technical and scientific terms used herein have the same meaning as commonly understood by one of ordinary skill in the art to which this disclosure belongs. Although methods and materials similar or equivalent to those described herein can be used in the practice or testing of the subject matter herein, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments are set forth in the accompanying drawings and the description below. Other features and advantages will be apparent from the description, drawings, and claims.

Definitions

As used herein, the terms "about" and "approximately" are used interchangeably, and when used to refer to modify a numerical value, encompass a range of uncertainty of the numerical value of from ½ of the numerical value to twice the numerical value.

As used herein, the singular forms "a," "an," and "the" include plural referents unless the context clearly dictates otherwise.

As used herein, the term "binder material" refers to a material or substance that contacts units of a filler material (e.g., grains, particles, fibers, and/or other individual structural entities) and holds the units of the filler material together to form a solid, integral composite material. A variety of different substances can be used as binder materials, including for example thermoplastic materials, thermosetting materials, elastomeric materials, polymer materials (e.g., polyesters, polyethersulfones, polysulfones, polyetherimides, epoxies, fluoropolymers, phenolic materials, vinyl esters, carboxymethylcellulose-based materials, polyetherketones, cyclic oligomers, polymethyl methacrylates, polycarbonates, and polybutylene terephthalates), ceramic materials, glasses, metals, alloys, salts, carbon materials, composites, and/or sulfur-containing materials.

As used herein, the term "filler material" refers to a material or substance that forms a majority (by percentage weight and/or by percentage volume) of a composite material, effectively constituting a major portion of the bulk structure of the composite material. A variety of different substances can be used as filler materials, including for example sand, soil, rocks, gravel, stones, bricks, metals, alloys, ceramics, polymers, elastomeric materials, thermosetting materials, thermoplastic materials, composites, glasses, solid waste (e.g., recycled waste), carbon materials, medicine, food, electrode materials, and/or any components of these materials.

As used herein, the term "compressive strength" refers to the resistance of a material to a compressive force applied to the material and having a tendency to reduce the volume of the material. To determine the compressive strength of a material, a compressive force is applied to the material, with the applied force increasing until the material is crushed (i.e., permanently deforms in a dimension along which the force is applied and/or fractures into multiple pieces due to the applied force). The compressive strength of a material, as used herein, is defined as $F_c/A_0$, where $F_c$ is the compressive force that crushes the material and $A_0$ is the initial cross-sectional area of the material over which the force is applied.

As used herein, the term "flexural strength" refers to the resistance of a material to a force applied to the material and having a tendency to bend or elongate the material. A material's flexural strength corresponds to the peak stress experienced in a material prior to the material yielding (i.e., fracturing) in a flexure test.

To determine the flexural strength of a material, a three-point bending test is used. In a three-point bending test, the material is formed as a beam and supported at two fixed positions (e.g., near the ends of the material) on the same side of the material, and a piston contacts the opposite side of the material midway between the fixed positions, applying a compressive force that tends to cause a bending deformation of the material. The flexural strength of a material, as used herein, is defined as $R=(3/2)(3/2)(P_{max}L/bd^2)$, where $P_{max}$ is the maximum load applied during the three-point bending test (i.e., the maximum load that can be sustained by the material without yielding (i.e., fracturing), b is the sample width, L is the span length between the fixed supports, and d is the sample height/thickness (i.e., in a direction along which the force is applied).

As used herein, the term "deformability" refers to the maximum strain present in the composite material before final fracture happens, when the material is subjected to compressive, tensile, bending, or torsion loadings. For a material that deforms along a dimension in response to an applied load, the material's deformability is defined as $\varepsilon=(L-L_0)/L_0$, where L is the length of the material along the dimension just before fracture, and $L_0$ is the length of the material along the dimension prior to the load being applied.

As used herein, the "crushing strength" of a material refers to the maximum compressive load that can be sustained by a material before it fractures into smaller pieces. A material's crushing strength is typically measured by using a piston to apply compressive force to a sample of the material relatively slowly, noting the applied force just prior to fracture.

The details of one or more embodiments are set forth in the accompanying drawings and the description below. Other features will be apparent from the description, drawings, and claims.

DESCRIPTION OF DRAWINGS

Like reference symbols in the various drawings indicate like elements.

DETAILED DESCRIPTION

Economic and environmental costs of preparing materials for structural use in construction, batteries, fabrication of pre-cast parts, and a variety of other applications can be significantly reduced by reducing the amount of binder used in the materials. In contrast to conventional materials where the binder material fills all of the interstitial spaces between units of the filler material, the composite materials produced by the methods described herein have binder material selectively located at the points of contact between units of the filler material. This allows for a very significant reduction in the amount of binder that is used.

Composite materials for use in structural applications should have suitable physical characteristics, such as flexural and compressive strength. It has been discovered that, even when the amount of binder material in composite materials is reduced as disclosed herein, advantageous physical properties such as flexural and compressive strength can still be maintained when the binder material is selectively located at points of contact or closest approach between units of the filler material. Composite materials with properties suitable for structural applications are also typically produced when filler materials are packed more densely within the composite structure.

Methods of fabricating the composite materials disclosed herein involve the application of relatively high pressures to mixtures of filler and binder materials. Without wishing to be bound by theory, it is believed that applying such high pressures assists both the close packing of the filler material and the location of the binder material. Specifically, it is believed that the application of pressure deforms and/or crushes the filler material into particles of varying size. The crushed filler material forms a denser, close-packed structure, reducing the interstitial gap volume. As the filler material units are compressed, the binder material is squeezed out of the interstitial sites and spread over the filler material unit surfaces. Capillary forces draw the binder material into the narrowest spaces to form microagglomerations at locations where the filler material units are close to one another.

Figure 1:
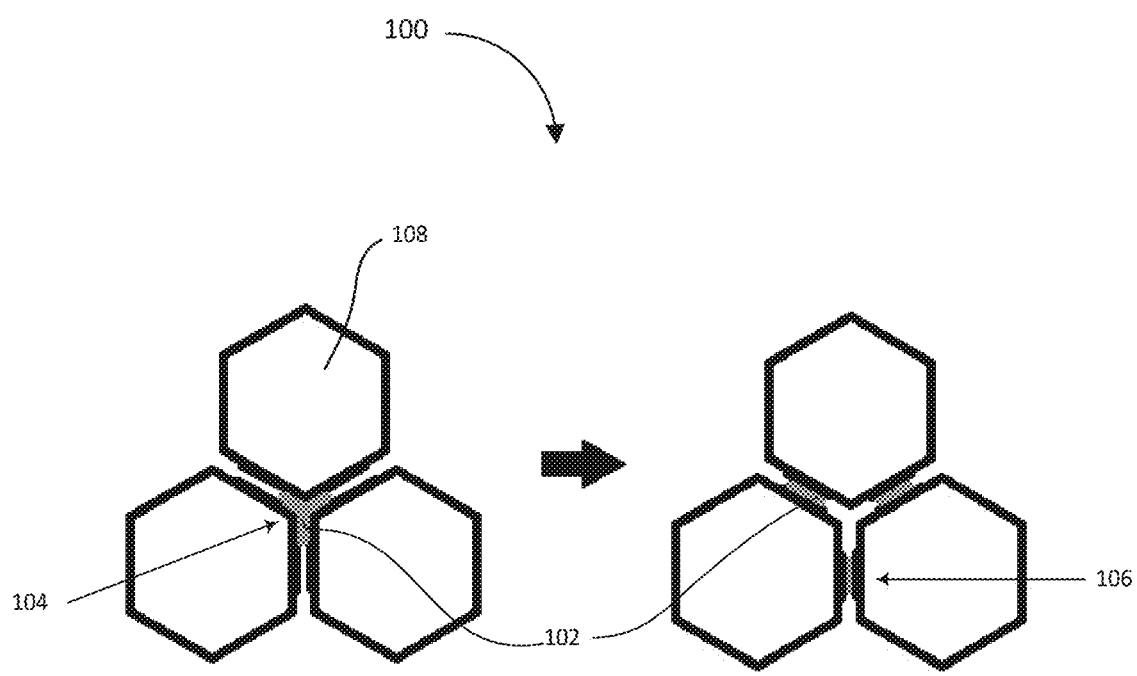
FIG. 1 is a schematic diagram showing redistribution of a binder material from interstitial gaps between filler material particles to regions of contact between the filler material particles during application of pressure to a mixture of binder and filler materials.

FIG. 1 is a schematic diagram 100 illustrating the movement of binder material 102 from the interstitial gaps 104 to contact regions 106 between the units of filler material particles 108 when suitable pressure is applied to the binder and filler materials. This process reduces the amount of binder material used in the composite material while increasing the fraction of binder material that is utilized to carry mechanical loads within the composite material structure. As a result, the composite material can be fabricated at reduced cost (due to the smaller amount of binder material used), while still achieving high material performance, due to the binder material functioning in a more "intelligent" manner within the composite structure.

The composite materials fabricated as disclosed herein can be used, for example, in structural materials, pre-cast components, battery electrodes, medicines, particulate composites, foods, and in a variety of other applications.

Fabrication of Composite Materials

The composite materials disclosed herein are generally prepared using a technique that is referred to as "pressure-aided self-assembly" (PASA). Units of a filler material are combined with a binder material to form a mixture (i.e., with or without a mechanical mixing step) in which the amount of binder material is relatively low, as will be explained further below. Then, relatively high pressure (e.g., greater than 10 MPa) is applied to the mixture to spread the binder material among the units of the filler material to form a solid, integral composite material. In an optional step, the composite material can then be set or cured. Setting or curing the composite material can include steps such as heating the composite material and/or casting/molding the composite material to fabricate pre-cast components formed from the composite material.

Figure 2:
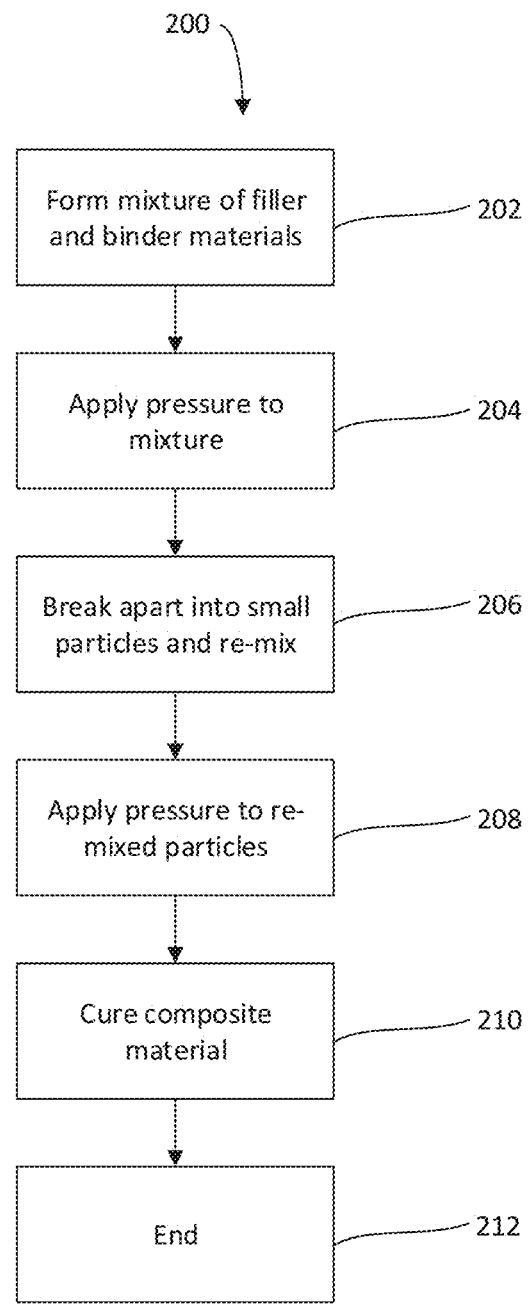
FIG. 2 is a flowchart showing a first series of steps for producing a composite material.

Pressure can generally be applied to the mixture of binder and filler materials according to different pressure-loading protocols. FIG. 2 is a flowchart 200 showing a series of steps for fabricating composite materials according to a pressure-loading protocol referred to as quasi-static mixing (QSM).

In a first step 202, a mixture of filler material and binder materials is formed. In some embodiments, a foaming agent or bubble-generating agent (e.g., toluenesulfonyl hydrazide, surfactants, and/or blowing agents) can be added to the mixture of filler and binder materials. It is believed that the addition of the foaming agent to the filler material and binder materials adjusts the properties of the filler and binder materials (e.g., adjusts the effective fluidity and volume of the binder and/or the wettability of the filler material).

Next, pressure is applied to the mixture in a second step 204. To apply pressure, in certain embodiments, the filler and binder materials can be placed in a vessel or cavity for this purpose. However, as will be explained in greater detail below, a variety of different methods and apparatus can be used to apply pressure to the mixture, and application of pressure in a vessel or cavity is only one possibility.

In some embodiments, the pressure applied is higher than the crushing strength of the filler material. As explained above, it is believed that by applying suitable pressure to the filler material in the mixture, the filler material is crushed, and thereby assumes a closer-packed arrangement of the crushed filler units or particles than prior to the application of pressure, enhancing the physical properties—such as compressive strength and flexural strength—of the composite material that is produced.

In some embodiments, the peak applied pressure is at least 10 MPa, for example, at least 20 MPa, at least 30 MPa, at least 40 MPa, at least 50 MPa, at least 70 MPa, at least 100 MPa, at least 150 MPa, at least 200 MPa, at least 250 MPa, at least 300 MPa, at least 350 MPa, at least 400 MPa, at least 500 MPa.

In some embodiments, the duration over which the peak pressure is applied is at least 1 second, for example, at least 2 seconds, at least 5 seconds, at least 10 seconds, at least 30 seconds, at least 1 minute, at least 2 minutes, at least 5 minutes, at least 10 minutes, at least 20 minutes, at least 30 minutes, at least 1 hour, at least 2 hours, at least 4 hours, at least 6 hours, at least 12 hours, at least 1 day, at least 2 days, or at least 3 days.

In general, pressure application is initiated and the applied pressure rises to the peak pressure value over a time period, during which the applied pressure varies. In some embodiments, the time duration between the initiation of pressure and the attainment of peak pressure is at least 1 millisecond, for example, at least 5 milliseconds, at least 10 milliseconds, at least 50 milliseconds, at least 100 milliseconds, or at least 500 milliseconds, at least 1 second, at least 2 seconds, at least 5 seconds, at least 10 seconds, at least 30 seconds, at least 1 minute, at least 2 minutes, at least 5 minutes, at least 10 minutes, at least 20 minutes, at least 30 minutes, at least 1 hour, at least 2 hours, at least 4 hours, at least 6 hours, or at least 12 hours.

In an optional third step 206, the mixture can be broken apart into particles/pieces and re-mixed. In some embodiments, following break-up of the composite material formed in step 204 into particles/pieces, the average particle/piece diameter is at least 1 µm, for example, at least 5 µm, at least 10 µm, at least 50 µm, at least 100 µm, at least 1 mm, at least 10 mm, at least 50 mm, at least 100 mm, at least 1 cm.

In an optional fourth step 208, pressure is applied again to the particles/pieces from step 206. In some embodiments, the optional re-application of pressure may be executed at least one time, for example, at least two times, at least three times, at least four times, at least five times, at least 10 times, at least 15 times, least 20 times, at least 30 times, at least 50 times, or at least 100 times. As explained above, it is believed that applying pressure in this manner causes fracture of the particles/pieces of the composite material, yielding smaller pieces that can assemble into a closer-packed arrangement. Further, it is believed that the application of pressure causes microagglomerations of the binder material to form at critical points between the particles/pieces, preserving the advantageous mechanical properties of the composite material.

In an optional fifth step 210, a curing operation (e.g., polymerization, hardening, solidification, or crosslinking) is performed on the material, resulting in a completed composite material, thus ending the process (at step 212).

Curing operations can be performed in various ways. For example, in some embodiments, curing can be performed in a cast, a mold (e.g., an open mold or a closed mold), or a container. Curing performed in this manner can be used to pre-fabricate a variety of cast parts and structural components such as support members and decorative elements that can be used in construction applications.

In certain embodiments, curing can be performed on a support surface (e.g., a planar or a curved surface). Composite materials cured on planar or curved surfaces can be used, for example, as functional material layers in a variety of applications, and as template materials from which various components can be cut or otherwise mechanically excised.

Figure 3:
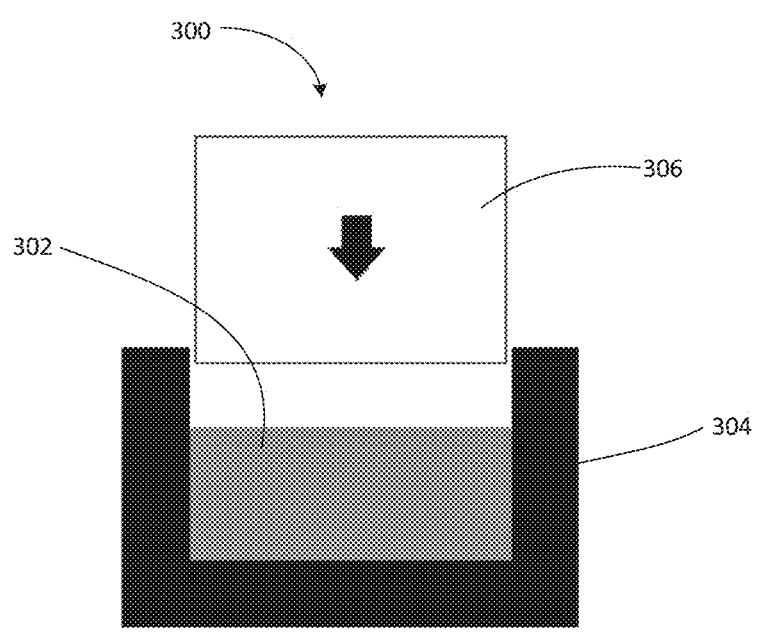
FIG. 3 is a schematic diagram showing an example apparatus used to produce a composite material.

FIG. 3 is a schematic diagram depicting an example apparatus 300 that can be used to perform the quasi-static mixing procedures disclosed above. The mixture of binder and filler materials is positioned in a cavity of a load cell 302. A piston 306 applies pressure to the binder and the filler materials to form the composite material.

Figure 4:
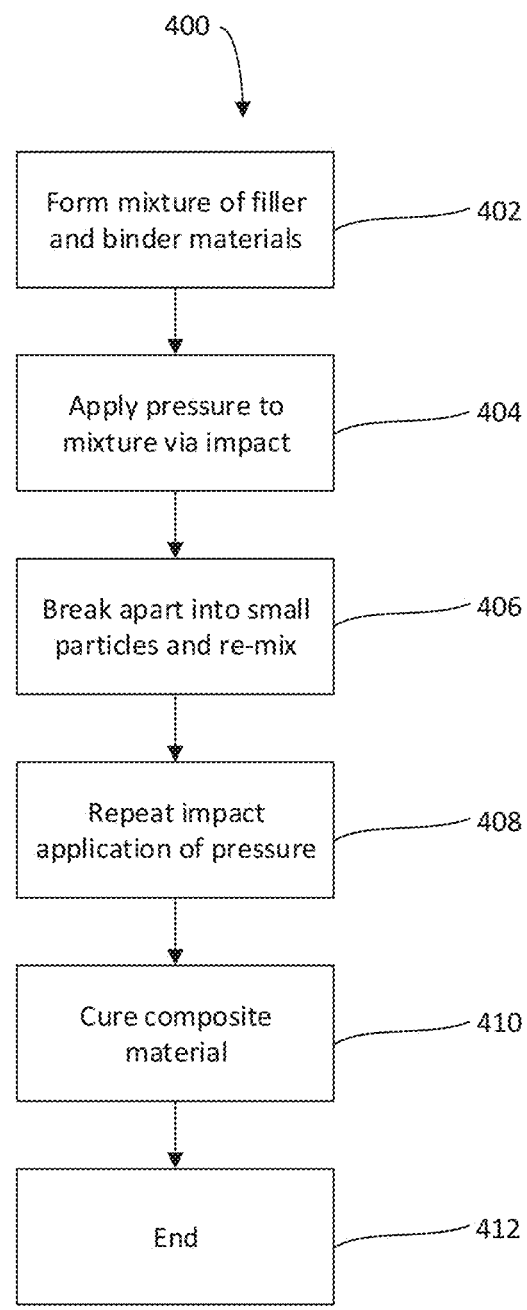
FIG. 4 is a flowchart showing a second series of steps for producing a composite material.

Another pressure-loading protocol that can be used to form the composite materials disclosed herein is referred to impact mixing (IM). FIG. 4 is a flow chart 400 showing a series of example steps for forming composite materials according to the impact mixing protocol.

In a first step 402, a mixture of filler material and binder materials is formed. In some embodiments, a foaming agent or bubble-generating agent (e.g., toluenesulfonyl hydrazide) is added to the mixture of filler and binder materials. It is believed that the addition of the foaming agent to the filler material and binder materials adjusts the properties of the filler and binder materials (e.g., adjusts the effective fluidity and volume of the binder and/or the wettability of the filler material, as explained above).

Next, impact pressure is applied to the mixture in a second step 404. For this purpose, in certain embodiments, the mixture of filler and binder materials can be placed in a vessel or cavity. However, as discussed above, other methods of applying pressure can also be used.

In some embodiments, the impact pressure exceeds the crushing strength of the filler material. In certain embodiments, the peak applied impact pressure can be at least 10 MPa, for example, at least 20 MPa, at least 30 MPa, at least 40 MPa, at least 50 MPa, at least 70 MPa, at least 100 MPa, at least 150 MPa, at least 200 MPa, at least 250 MPa, at least 300 MPa, at least 350 MPa, at least 400 MPa, at least 500 MPa.

In some embodiments, the duration over which impact pressure is applied to the mixture is at least 10 microseconds, for example, at least 20 microseconds, at least 30 microseconds, at least 50 microseconds, at least 100 microseconds, at least 200 microseconds, at least 1 millisecond, at least 5 milliseconds, at least 10 milliseconds, at least 50 milliseconds, at least 100 milliseconds, at least 500 milliseconds, at least 1 second.

When impact pressure is applied to the mixture, the applied pressure rises very quickly from zero to the peak applied pressure. In certain embodiments, for example, the time duration between the initial rise of the applied pressure and the attainment of the peak applied pressure is 1 second or less, for example, 1 millisecond or less, 500 microseconds or less, 300 microseconds or less, 200 microseconds or less, 100 microseconds or less, 50 microseconds or less, 20 microseconds or less, 10 microseconds or less, 5 microseconds or less, 1 microsecond or less.

In an optional third step 406, the composite material formed in step 404 can be broken apart into particles/pieces and re-mixed. In some embodiments, following the break-up of the composite material formed in step 404 into particles/pieces, the average particle/piece diameter is at least 1 µm, for example, at least 5 µm, at least 10 µm, at least 50 µm, at least 100 µm, at least 1 mm, at least 10 mm, at least 50 mm, at least 100 mm, at least 1 cm.

In an optional fourth step 408, impact pressure is applied to the particles/pieces of the composite material from step 406. The optional re-application of impact pressure can occur at least one time, for example, at least two times, at least three times, at least four times, at least five times, at least 10 times, at least 15 times, at least 20 times, at least 30 times, at least 50 times, at least 100 times. As explained above, it is believed that applying pressure in this manner causes fracture of the particles/pieces of the composite material, yielding smaller pieces that can assemble into a closer-packed arrangement. Further, it is believed that the application of pressure causes microagglomerations of the binder material to form at critical points between the particles/pieces, preserving the advantageous mechanical properties of the composite material.

In an optional fifth step 410, a curing operation can be performed on the composite material, after which the process (at step 412). As discussed above, curing operations can be performed in a variety of ways, including for example curing in a cast, a mold, or a container to fabricate preformed parts from composite materials, and curing on planar and/or curved surfaces to form functional layers or sheets of the composite material.

Figure 5:
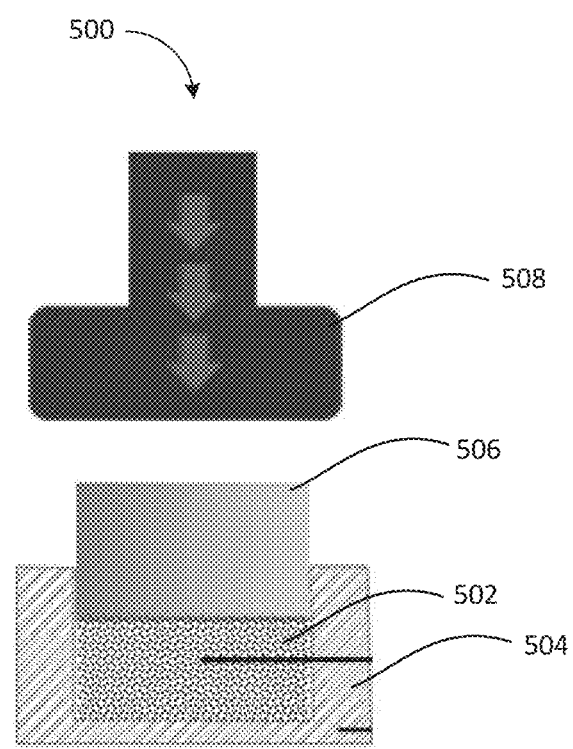
FIG. 5 is a schematic diagram showing another example apparatus used to produce a composite material.

FIG. 5 is a schematic diagram depicting an example apparatus 500 that can be used to perform the impact mixing procedures disclosed herein. The mixture of binder and filler materials 502 is positioned in a cavity of a load cell 504, and a piston 506 is positioned above the cavity. An impact head 508 (e.g., a hammer) rapidly strikes the piston, driving it into the mixture of binder and filler materials and applying pressure to the mixture to form the composite material.

In both the QSM and IM pressure-loading protocols, pressure can be applied to the mixture of binder and filler materials in a variety of ways. In general, pressure can be applied in the form of compressive loads, tensile loads, shear loads, vacuum loading, roller loads, bending loads, impact loads, vibrational (i.e., dynamic) loads, and combinations of these.

In some embodiments, where pressure is applied via compressive loading, a variety of mechanical devices such as pistons, hydraulic machines, mechanical presses, weights, rollers, calendaring systems, extrusion systems, molding systems (e.g., injection molding systems and/or compression molding systems), and combinations of such systems can be used.

In certain embodiments, where pressure is applied via one or more impacts on the mixture of binder and filler materials (e.g., a compressive load that increases in magnitude over a relatively short duration), the impact pressure can applied by an impact head (e.g., a hammer), a drop tower, an impactor, a weight, a blast loading, an explosive compression, a high-speed roller, a high-pressure gas system, a hydraulic system, and via combinations of these methods.

In some embodiments, rather than applying pressure to the entire volume of the mixture of filler and binder materials, processing methods can be used in which portions of the mixture are selectively pressurized. In this manner, mixtures having different compositions, as will be discussed later, can be formed into a single, integral, solid composite material in which the composition of the material varies as a function of position within the material. That is, different portions of the material can have different compositions for different functional and/or structural applications. Further, selective fabrication methods in which different portions of the mixture are pressurized at different times permit fabrication that is akin to 3D printing, in which layers or portions of a final composite material are selectively formed or built up to yield a final product. These methods can be referred to collectively as "sectioned" processing of the composite materials.

Figure 6A:
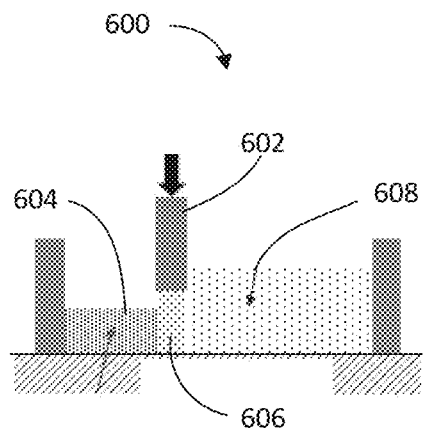
FIGS. 6A-6B are schematic diagrams showing stepwise compression of filler material and binder materials by a piston and by a roller, respectively.
Figure 6B:
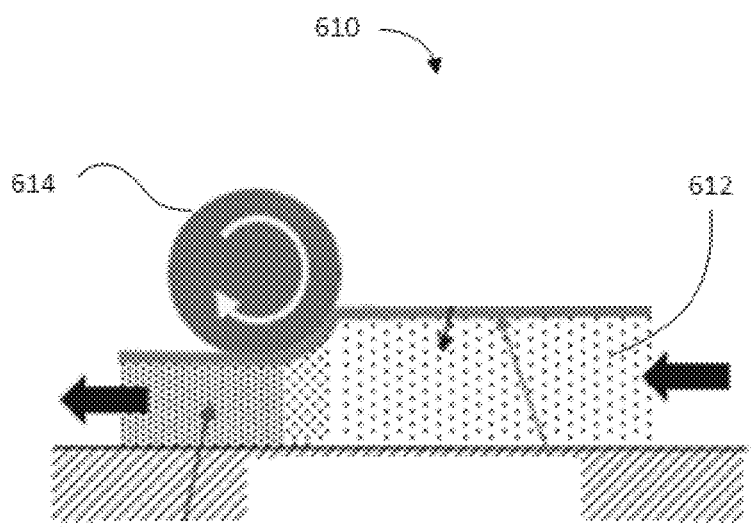

FIGS. 6A and 6B are schematic diagrams showing two examples of sectioned processing. In FIG. 6A, the binder and the filler materials are compressed in portions or stages in apparatus 600. Composite material 604 has already been formed by the application of pressure via piston 602. Piston 602 is in the process of pressurizing a section of binder and filler materials 606, while binder and filler materials 608 have not yet been pressure-treated.

In FIG. 6B, a mixture of binder and filler materials 612 is compressed by a roller 614 as part of a processing apparatus 610. Roller 614 selectively applies pressure to only that portion of the mixture under the roller. As such, the portion of the mixture to the left of roller 614 in FIG. 6B has already be pressure treated, while portion 612 of the mixture has not yet been pressure treated.

These examples illustrate how the binder and filler mixture can be compressed section by section, with various pressures, loading rates, loading modes, loading methods, loading directions, and loading times. Each section can be compressed either once or multiple times. Different sections may overlap, and at different steps of the pressure application, the section boundaries may change.

In certain embodiments, different regions of the composite material can have different compositions. By using the sectioned processing methods discussed above, mixtures with different combinations or binder materials and/or filler materials can be pressurized to form a single, integral, solid composite material. For example, composite materials formed by successive layers with different combinations of binder materials and/or filler materials can be combined into a single composite material using techniques such as rolling, as shown in FIG. 6B. Composition variations can occur in any of three spatial dimensions.

Variations in material composition can even be introduced during pressurization, as additional filler and/or binder materials can be added to unpressurized portions of the composite material while other portions of the material are being pressurized. Further, different pieces or particles of once-pressurized composite materials can be subjected to further pressurization cycles, thereby combining the pieces into a single composite material with composition variations.

In general, within different regions, the composite material can include different binder materials, different filler materials, or both different binder and different filler materials. Any of the binder and filler materials (and combinations thereof) that are disclosed herein can be used to form these structurally complex composite materials.

Figure 25:
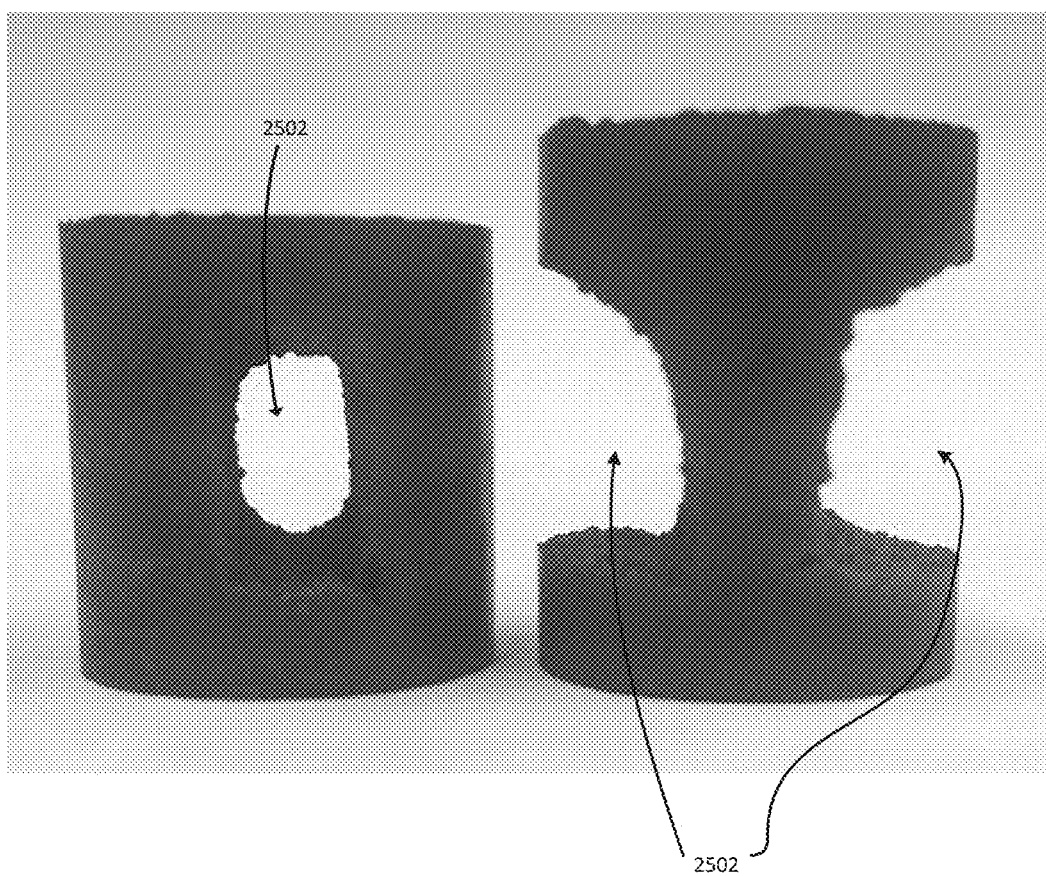
FIG. 25 is an image showing examples of composite materials that include a soil filler material and an epoxy binder material, and featuring voids or recesses.

In some embodiments, features such as voids or surface features can be created in the composite material using molding techniques and/or by varying the composition of the composite materials. For example, a void can be created in a composite material by adding only filler material to the region, or filler material with a very small amount of binder material. The resulting composite material will lack structural integrity in that region, allowing the filler material or low-binder composite portion to be separated from the remainder of the composite material using techniques such as polishing, extraction, washing, and/or sonication. The resulting composite material will include voids corresponding to the former locations of the filler material or low-binder composite portion. FIG. 25 shows an image of a composite material with voids 2502.

In both the QSM and IM protocols, depending on the binder material used, the specific conditions of the curing step may or may not involve the application of heat. In some embodiments, the curing step is performed at a peak temperature of about 0° C. or higher, for example, at about 10° C. or higher, at about 20° C. or higher, at about 30° C. or higher, at about 50° C. or higher, at about 100° C. or higher, at about 200° C. or higher, at about 300° C. or higher, at about 400° C. or higher, at about 500° C. or higher, at about 800° C. or higher, at about 1000° C. or higher, at about 1200° C. or higher, at about 1400° C. or higher, at about 1600° C. or higher, at about 1800° C. or higher, or at about 2000° C. or higher. In some embodiments, the setting step is performed at a peak temperature at about room temperature, at about 80° C., at about 100° C., or at about 200° C.

When the curing step occurs with the application of heat, there may be a desired rate of equilibration to the peak temperature. In some embodiments, the rate at which equilibration to the peak temperature of the curing step occurs is 0.1° C. per minute or higher, for example, 0.2° C. per minute or higher, 0.5° C. per minute or higher, 1° C. per minute or higher, 2° C. per minute or higher, 5° C. per minute or higher, 10° C. per minute or higher, 15° C. per minute or higher, 20° C. per minute or higher, 50° C. per minute or higher, 100° C. per minute or higher, 200° C. per minute or higher, 500° C. per minute or higher.

In general, the duration of the curing step depends upon the binder material(s) that are used to form the composite material. For example, the curing step can be performed for at least 5 minutes, for at least 10 minutes, for at least 20 minutes, for at least 30 minutes, for at least 40 minutes, for at least 1 hour, for at least 2 hours, for at least 3 hours, for at least 6 hours, for at least 12 hours, for at least 24 hours, for at least 36 hours, for at least 2 days, for at least 3 days, for at least 4 days, for at least 6 days, for at least 7 days, for at least 10 days, for at least 2 weeks, for at least 1 month.

In some embodiments, the curing step can be performed under air or in an inert atmosphere (e.g., a nitrogen atmosphere or an argon atmosphere), depending upon, for example, the moisture and/or oxygen sensitivity of the binder material(s) in the composite materials.

Composite Material Composition and Properties

As discussed above, the composite materials disclosed herein include a filler material and a binder material disposed between at least some units of the filler material to form an integral composite material.

In general, the composite materials disclosed herein include relatively small amounts of the binder material(s). However, pressure-based processing of the mixtures of binder and filler materials yields composite materials which nonetheless retain advantageous mechanical and functional properties.

In some embodiments, the composite materials include less than 18% by weight of the binder material (e.g., less than 14% by weight of the binder material, less than 10% by weight of the binder material, less than 9% by weight of the binder material, less than 8% by weight of the binder material, less than 7% by weight of the binder material, less than 6% by weight of the binder material, less than 5% by weight of the binder material, less than 4% by weight of the binder material, less than 3% by weight of the binder material, less than 2% by weight of the binder material, less than 1% by weight of the binder material, less than 0.5% by weight of the binder material, less than 0.2% by weight of the binder material). In some embodiments, the composite materials include less than 18% by weight of the binder material.

In certain embodiments, the composite materials include less than 20% by volume of the binder material (e.g., less than 19% by volume of the binder material, less than 18% by volume of the binder material, less than 17% by volume of the binder material, less than 16% by volume of the binder material, less than 15% by volume of the binder material, less than 14% by volume of the binder material, less than 13% by volume of the binder material, less than 12% by volume of the binder material, less than 11% by volume of the binder material, less than 10% by volume of the binder material, less than 9% by volume of the binder material, less than 8% by volume of the binder material, less than 7% by volume of the binder material, less than 6% by volume of the binder material, less than 5% by volume of the binder material, less than 4% by volume of the binder material, less than 3% by volume of the binder material, less than 2% by volume of the binder material, less than 1% by volume of the binder material). In some embodiments, the composite materials include less than 10% by weight of the binder material and less than 20% by volume of the binder material.

In general, the composite materials include one or more binder materials. The binder material content of the composite material typically influences the composite material's compressive strength, flexural strength, or both, as microagglomerations of the binder material are positioned between units of the filler material and can support a variety of material loads. Accordingly, properties of the composite materials can be modified by including particular binder materials within the composite materials. Example binder materials that can be used include thermoplastics, thermosetting materials, elastomers, natural polymers, synthetic polymers, ceramics, glasses, metals, alloys, salts, sulfur-containing compositions, chemical precursors of the foregoing materials, and combinations of the foregoing materials (e.g., polyesters, epoxies, fluoropolymers, phenolic compounds, vinyl esters, carboxymethylcelluloses, polyetherketoneketones, cyclic oligomers, poly(methyl methacrylates), polycarbonates, and polybutylene terephthalates).

In some embodiments, the binder material can be diluted with at least one of a solid, a liquid, or a gas. Example diluents include, but are not limited to, water, aqueous solutions, organic solvents (e.g., ethanol), solutions including organic solvents, surfactants, surfactant-releasing solids or gels, gas bubbles, gas generation agents, inorganic solvents, solutions including inorganic solvents, lubricants, and/or solid particles. In some embodiments, the binder material includes chemical precursors (e.g., resins, initiators, or hardeners) that react and/or harden during fabrication (e.g., during the curing step) to form, for example, various polymers.

In general, the composite materials include one or more filler materials. The filler materials also influence the physical properties of the composite materials, and therefore adjustment of the properties of the composite materials can be achieved through selection of suitable filler materials. Example filler materials include wood, fabrics, mats, sand, soil, rocks, concrete, cement, minerals, inorganic compounds, organic compounds, gravels, stones, bricks, metals, alloys, ceramic materials, polymers, elastomeric materials, thermosetting materials, thermoplastic materials, composites, glasses, aerogels, porous materials, cellular materials, aerogels, solid waste, recycled materials, medicine, food, carbon materials, electrode materials, components of these materials, and combinations of these materials. In certain embodiments, when the filler material is soil, the soil can include various different types of soil, including terrestrial soils and/or extraterrestrial soils (e.g., lunar soil). In some embodiments, the soil includes extraterrestrial soil, rocks, and/or minerals. In some embodiments, when the filler includes rocks and/or minerals, the rocks and/or minerals can be extraterrestrial rocks and/or minerals (e.g., lunar rocks and/or minerals).

In some embodiments, the size distribution of units of the filler materials can be random. In certain embodiments, the size distribution of units of the filler materials can be controlled, using, for example, sieve analysis, size selection, size exclusion, and/or size promotion.

In some embodiments, the at least one filler material can be subjected to a surface treatment or coating. Without wishing to be bound by theory, it is believed that the surface treatment or coating promotes bonding of the binder material(s) to the filler material(s), thereby enhancing the mechanical properties of the composite material.

In general, the units of the filler material can include materials in various morphological forms. For example, the filler material can include units in the form of one or more of powders, beads, dots, grains, particles, chips, cubes, layers, layer stacks, blocks, spheres, fibers, tubes, beams, pipes, rods, threads, platelets, coatings, hollow beads, hollow fibers, hollow blocks, hollow layers, bilayers, porous materials, meshes, fabrics, mats, honeycombs, and three-dimensional forms.

The composite materials disclosed herein can also include other types of materials for structural and functional applications. For example, the composite materials can include at least one aggregate material to add mechanical strength to the composite material structure. The composite materials can also include at least one reinforcing material to augment the structural integrity of the composite materials. These additional materials can generally be added at any time during fabrication of the composite materials, for example, during the formation of the mixture of filler material and binder material, or before, between, or after the application of pressure to the mixture.

Example aggregate materials that can be used include any of the filler materials disclosed herein. In some embodiments, aggregate materials can be subjected to a surface treatment or coating prior to inclusion in the composite material. The surface treatment or coating adjusts the bonding strength of the aggregate material.

Example reinforcing materials include any of the filler materials described herein. Reinforcing materials can also be subjected to surface treatments or coatings to adjust the bonding strength of the reinforcing materials.

In some embodiments, the composite materials can include at least one additive. Additives can, for example, adjust the properties of the composite material or aid in the preparation of the composite material. Example additives include, but are not limited to, foaming agents, bubble-generating agents, solvents, lubricants, components of the foregoing materials, and combinations of the foregoing materials.

Additives can be combined with other components of the composite materials at various stages of fabrication, including prior to applying pressure to the composite materials, and between pressurization cycles. In addition, additives can be added to only certain regions of a mixture or a composite material so that the properties of the composite material are different at different locations within the material.

In certain embodiments, the composite materials disclosed herein can include more than one binder material and/or more than one filler material. Combinations of multiple binder materials and/or multiple filler materials can be used to prepare composite materials with particular physical properties (e.g., flexural strength, compressive strength) and/or particular functional properties (e.g., electrical resistance). In general, a wide variety of different combinations of filler materials and binder materials can be used, including combinations of any of the filler materials and any of the binder materials disclosed herein. In some embodiments, the composite materials disclosed herein can include 2 or more different filler materials (e.g., 3 or more different filler materials, 4 or more different filler materials, 5 or more different filler materials, or even more different filler materials). In certain embodiments, the composite materials disclosed herein can include 2 or more different binder materials (e.g., 3 or more different binder materials, 4 or more different binder materials, 5 or more different binder materials, or even more different binder materials).

In some embodiments, the distribution of one or more filler materials and/or one or more binder materials can be heterogeneous within the composite materials. By varying the distribution of filler material(s) and/or binder material(s) within the composite materials, the materials can be manipulated to have spatially varying physical and/or functional properties. As such, the methods disclosed herein permit in situ fabrication of functional materials with controlled variations in properties, suitable for a variety of applications. In particular, selective or sectioned processing methods, examples of which are shown in FIGS. 6A and 6B, can be used to fabricate composite materials in which the distributions of one or more binder materials and/or one or more filler materials are non-uniform.

For example, in certain composite materials, the distribution of a binder material within the composite material is non-uniform. Such materials can include distinct regions in which the binder material distribution or concentration is constant, but where the binder distribution or concentration differs among at least some of the regions. In some examples, the distribution or concentration of the binder material varies continuously from one location to another within the material.

Similar considerations apply to filler materials. In certain composite materials, the distribution of a filler material is non-uniform. The concentration or distribution of the filler material can vary in step-wise fashion between different regions of the composite material, or in a smoothly varying continuous or semi-continuous fashion through the composite material.

In addition, for composite materials that include two or more filler materials and/or two or more binder materials, the distribution or concentration of each of the binder materials and/or each of the filler materials can vary as discussed above.

The effect of a non-homogeneous distribution of one or more filler or binder materials within the composite material is that the weight percentage of the binder material and/or the volume percentage of the binder material can vary within the composite material. For example, in some composite materials fabricated as disclosed herein, the weight percentage of a binder material can have a first value at one location or region in the composite material, and a second, different value at another location or region in the material. The weight percentage at any location or region can have a value as discussed previously, for example.

Similarly, in certain composite materials, the volume percentage of a binder material can have a first value at one location or region in the composite material, and a second, different value at another location or region in the material. The volume percentage at any location or region can have a value as discussed previously, for example. Where composite materials include more than one binder material, the weight and/or volume percentages of each of the binder materials can vary independently of the other binder materials. Similar considerations apply to the distribution of filler materials within the composite materials.

As discussed previously, although the materials disclosed herein include binder materials in smaller concentrations than is typical for structural materials, the compressive strength of the composite materials is higher than many structural materials such as cement that are currently in use. In some embodiments, the composite materials prepared by the methods described herein have a compressive strength of 1 MPa or higher, for example, 3 MPa or higher, 5 MPa or higher, 10 MPa or higher, 15 MPa or higher, 20 MPa or higher, 25 MPa or higher, 30 MPa or higher, 35 MPa or higher, 40 MPa or higher, 50 MPa or higher, 60 MPa or higher, 70 MPa or higher, 100 MPa or higher. It has been observed that when the form of the applied pressure is impact pressure during fabrication, the compressive strength of the composite material correlates with the number of impacts.

The composite materials disclosed herein also have advantageous flexural properties, despite the relatively low concentration of binder materials therein. In some embodiments, the composite materials prepared by the methods described herein have a flexural strength of 0.1 MPa or higher, for example, 1 MPa or higher, 3 MPa or higher, 5 MPa or higher, 10 MPa or higher, 15 MPa or higher, 20 MPa or higher, 25 MPa or higher, 30 MPa or higher, 35 MPa or higher, 40 MPa or higher, 50 MPa or higher, 60 MPa or higher, 70 MPa or higher, 100 MPa or higher.

Because the composite materials disclosed herein include relatively small amounts of binder material(s) and comparatively larger amounts of filler material(s), where the flexural strength of the binder material(s) is/are less than the flexural strength of the filler material(s), the composite materials will generally have flexural strengths that are greater than the flexural strengths of the binder material alone. In some embodiments, for example, the composite materials have a flexural strength that is at least 20% larger (e.g., at least 30% larger, at least 40% larger, at least 50% larger, at least 60% larger, at least 70% larger, at least 80% larger, at least 90% larger, at least 100% larger, at least 200% larger, at least 300% larger, at least 500% larger, at least 700% larger, at least 1000% larger) than a product of the flexural strength of the binder material and a weight percentage of the binder material in the composite material.

In certain embodiments, the composite material has a flexural strength that is at least 20% larger (e.g., at least 30% larger, at least 40% larger, at least 50% larger, at least 60% larger, at least 70% larger, at least 80% larger, at least 90% larger, at least 100% larger, at least 200% larger, at least 300% larger, at least 500% larger, at least 700% larger, at least 1000% larger) than a product of the flexural strength of the binder material and a volume percentage of the binder material in the composite material.

Composite materials prepared according to the methods disclosed herein also have high deformability. In some embodiments, for example, the composite materials disclosed herein have a deformability of 0.1% or higher, 1% or higher, 5% or higher, 10% or higher, 15% or higher, 20% or higher, 25% or higher, 30% or higher, 35% or higher, 40% or higher, 50% or higher.

Filler and binder materials can be selected to impart a variety of physical properties to the composite materials. Among these are flexural and compressive strength, as discussed above. Control over other physical properties can also be achieved. For example, in some embodiments, the choice of filler and binder materials, as well as the relative amounts of each and the processing steps used to form the composite material, can be used to produce a composite material with advantageous electrical properties.

Resistive heating in electrical devices occurs when large currents flow through circuit elements that are not designed to handle such currents; the elements overheat, leading to failure of the elements and potentially, catastrophic damage to other device components. Excess heating can also result from physical abuse or mishandling of electrical devices, which can cause damage to circuit elements, increasing their resistance and leading to resistive heating.

The methods disclosed herein can be used to fabricate (e.g., used to form) composite materials that function as sacrificial elements within electrical devices such as electrodes, current collectors, batteries, voltage sources, and current sources. The composite materials have temperature-dependent and/or pressure-dependent resistance profiles such that when the temperature and/or pressure applied to the composite material increases significantly, the resistance of the composite material also increases significantly. Thus, when current flows within a device that contains such a material, it is the composite material that undergoes resistive heating and subsequent failure, due to the increased resistance of the composite material. In this fashion, the composite material may be rendered inoperable. However, the failure of the composite material interrupts current flow within the device, ensuring that resistive heating within other device elements and components does not occur. As such, the composite material acts as a sacrificial element to prevent more significant thermally- and/or mechanically-induced damage to the device's components.

In some embodiments, when the temperature of the composite material increases by 20° C., the electrical resistance of the composite material increases by at least 20% (e.g., at least 30%, at least 40%, at least 50%, at least 60%, at least 70%, at least 80%, at least 90%, at least 95%, at least 99%, at least 100%, at least 200%, at least 500%, or at least 10000/o). In certain embodiments, when the temperature of the composite material increases by 30° C., the electrical resistance of the composite material increases by at least 40% (e.g., at least 60%, at least 80%, at least 100%, at least 200%, at least 400, or at least 1000%).). In some embodiments, when the temperature of the composite material increases by 50° C., the electrical resistance of the composite material increases by at least 70% (e.g., at least 200%, at least 300%, at least 500%, at least 1000%). In some embodiments, when the temperature of the composite material increases by 70° C. (e.g., at least 80° C., at least 90° C., at least 100° C., at least 110° C., at least 120° C.), the electrical resistance of the composite material increases by at least 100% (e.g., at least 200%, at least 300%, at least 500%, at least 1000%).

In some embodiments, when the temperature of the composite material increases by at least 20° C., the electrical resistance of the composite material increases by at least 20% (e.g., at least 30%, at least 40%, at least 50%, at least 60%, at least 70%, at least 80%, at least 90%, at least 95%, at least 99%, at least 100%, at least 200%, at least 500%, or at least 1000%). In certain embodiments, when the temperature of the composite material increases by at least 30° C., the electrical resistance of the composite material increases by at least 40% (e.g., at least 60%, at least 80%, at least 100%, at least 200%, at least 400, or at least 1000%). In some embodiments, when the temperature of the composite material increases by at least 50° C., the electrical resistance of the composite material increases by at least 70% (e.g., at least 200%, at least 300%, at least 500%, at least 1000%). In some embodiments, when the temperature of the composite material increases by at least 70° C. (e.g., at least 80° C., at least 90° C., at least 100° C., at least 110° C., at least 120° C.), the electrical resistance of the composite material increases by at least 100% (e.g., at least 200%, at least 300%, at least 500%, at least 1000%).

In certain embodiments, when the composite material is subjected to a pressure of 0.1 MPa, an electrical resistance of the composite material increases by at least 20% (e.g., at least 30%, at least 40%, at least 50%, at least 60%, at least 70%, at least 80%, at least 90%, at least 100%, at least 200%, or at least 1000%). In some embodiments, when the composite material is subjected to a pressure of 0.5 MPa, the electrical resistance of the composite material increases by at least 30% (e.g., at least 40%, at least 50%, at least 70%, at least 100%, at least 200%, at least 300%, or at least 1000%). In certain embodiments, when the composite material is subjected to a pressure of 1 MPa, the electrical resistance of the composite material increases by at least 40% (e.g., at least 50%, at least 100%, at least 150%, at least 200%, at least 300%, at least 500%, at least 700%, at least 1000%). In some embodiments, when the composite material is subjected to a pressure of 5 MPa (e.g., at least 10 MPa, at least 20 MPa, at least 50 MPa, at least 100 MPa, at least 200 MPa, at least 500 MPa), the electrical resistance of the composite material increases by at least 50% (e.g., at least 100%, at least 150%, at least 200%, at least 300%, at least 500%, at least 700%, at least 1000%).

In certain embodiments, when the composite material is subjected to a pressure of at least 0.1 MPa, an electrical resistance of the composite material increases by at least 20% (e.g., at least 300%, at least 40%, at least 50%, at least 60%, at least 70%, at least 80%, at least 90%, at least 100%, at least 200%, or at least 1000%). In some embodiments, when the composite material is subjected to a pressure of at least 0.5 MPa, the electrical resistance of the composite material increases by at least 30% (e.g., at least 40%, at least 50%, at least 70%, at least 100%, at least 200%, at least 300%, or at least 1000%). In certain embodiments, when the composite material is subjected to a pressure of at least 1 MPa, the electrical resistance of the composite material increases by at least 40% (e.g., at least 50%, at least 100%, at least 150%, at least 200%, at least 300%, at least 500%, at least 700%, at least 1000%). In some embodiments, when the composite material is subjected to a pressure of at least 5 MPa (e.g., at least 10 MPa, at least 20 MPa, at least 50 MPa, at least 100 MPa, at least 200 MPa, at least 500 MPa), the electrical resistance of the composite material increases by at least 50% (e.g., at least 100%, at least 150%, at least 200%, at least 300%, at least 500%, at least 700%, at least 1000%).

Applications

The composite materials disclosed herein, owing to their reduced cost of production, "greener" methods of fabrication, and favorable physical properties, can be used in a number of applications, including as substitutes for conventional cement or concrete in structural materials (e.g., lunar infrastructural materials), in batteries (e.g., electrodes), as medicines, and in foods. A number of examples of such applications are described below.

(i) Construction

When used in the context of construction, the composite materials can, for example, be prepared on-site using existing equipment and infrastructure already used in the preparation of Portland cement, concrete, and other structural materials. The composite materials can be formed or cured in a variety of shapes as desired for use as structural elements, reinforcing members, and decorative elements in building construction.

(ii) Pre-Cast Components

The composites can also be prepared by setting the mixture in a cast or similar cavity or surface that allows manufacture of parts and components with desired shapes and contours. These cast parts can include structural members and decorative elements for use in construction, electrical device fabrication, and other applications.

(iii) Three-Dimensional Printing and Additive Manufacturing

In some embodiments, the composite materials are produced using three-dimensional printing techniques or additive manufacturing. The material can, for example, be processed layer by layer, section by section, or part by part, over multiple steps, as discussed above in connection with FIGS. 6A and 6B. For example, the mixture of the filler and binder materials can be gradually added to a working station in batches; after each batch of mixture is added, the batch is compressed, followed by addition of the next batch. In some embodiments, curing of the material is performed after each batch of mixture has been compressed, after several batches of the mixture have been compressed, or after all of the batches of the mixture have been compressed. In some embodiments, compression and breaking apart of the composite material can be performed one or more times. In some embodiments, the identity and/or content of the filler and/or binder materials is different between different batches. Likewise, in certain embodiments, the applied pressure and/or type of pressure load is different between different batches.

(iv) Thermally-Responsive Coatings that Mitigate Thermally-Related Damage

In some embodiments the methods disclosed herein can be used to produce thermally responsive composite materials (TRCMs) for electric energy storage or energy conversion devices (e.g., batteries, lithium-ion batteries, capacitors, pseudo-supercapacitors, and energy conversion devices that contain electrodes). The TRCMs can be formed as coatings, mixed components, aggregated components, fibers, layers, blocks, particles, beads, grains, or any combination thereof, in an energy storage or conversion device.

When electric energy storage or conversion devices are used and a malfunction or damage occurs, the temperature in the devices, for example, can rise to above the working temperature range. In such cases, a TRCM coating (TRCMC) acts as a "sacrificial element" that is damaged by the high temperature, resulting in an increase in the impedance of the component that is coated with the TRCMC. The increase in impedance of the coated component reduces the current that flows in the device, reducing short-circuit current and mitigating thermal runaway (i.e., preventing the overheating of one or more parts of the electric energy storage or conversion device). By sustaining damage to increase its electrical resistance, TRCM protects the components it is applied to or associated with.

(v) Thermally-Responsive Coatings that Mitigate Mechanically-Triggered Damage

In some embodiments, when mechanical abuse is inflicted on an electric energy storage or conversion device that contains a TRCMC applied to a component of the device, the resistivity of the TRCM increases in response to the mechanical perturbation, thereby reducing the current that flows through the device and preventing the device from overheating. Here again, the TRCM acts as a sacrificial element to protect the device, in this case from failure due to physical handling.

Composite materials that function as TRCMs can generally be fabricated using the methods disclosed herein by preparing mixtures that contain a relatively low binder material concentration and/or mixtures in which a relatively large mismatch in properties exists between the filler and binder materials. Various physical responses of the composite materials can lead to sacrificial damage to the materials.

In some embodiments, for example, swelling of the TRCM in response to elevated temperature and/or mechanical perturbation can lead to irreversible structural damage and increased resistivity.

Thermally-responsive composite material coatings can be applied inside, next to, or associated with various functional components of electric energy storage and conversion devices, including electrodes, current collectors, anodes, cathodes, separators, cell cases, spacers, wires, electrolytes, module cases, battery pack cases, capacitor pack cases, and to other locations inside of, next to, or near such devices.

(vi) Biomimicking Materials

The methods disclosed herein can also be used to fabricate a variety of biomimicking materials. Biomimicking materials have nano- or micro-structures similar to those of biomaterials including, for example, natural or man-made materials that contain a large amount of filler and/or reinforcing material and a relatively small amount of binder materials. Example biomimicking materials that can be prepared using the methods described herein include, but are not limited to, artificial teeth, bones, nails, shells, scales, skins, muscles, tendons, nacre, ivory, hooves, horns, and/or other animal body parts.

(vii) Soil Liquefaction

Soil liquefaction is a phenomenon in which soil loses structural integrity or stiffness, losing some or all of its load-bearing capacity. Soil liquefaction, when it occurs underneath or in close proximity to structures, can be extremely troublesome if it leads to loss of underlying support for the structures. For example, buildings that have foundations built directly on sand that liquefies will experience an abrupt loss of support, resulting in extreme and irregular settling of the building structure, potentially causing extensive damage.

The fabrication methods disclosed herein can be used with earth as the filler material in the composite materials. When the filler material earth is located beneath or around structures, the formation of composite materials incorporating the earth can significantly increase ground-level support provided to the structures, reducing the potential for costly damage arising from the loss of structural support due to soil liquefaction. For example, a solution of a binder material (e.g., an epoxy material) can be added directly to soil and allowed to stand until it hardens. This increases the resistance of the soil-based composite material to liquefaction or mechanical erosion.

(viii) Electrodes

In some embodiments, the methods disclosed herein can be used to produce electrodes that contain a large amount of active material grains and a relatively small amount of binder material. Electrodes fabricated using these methods typically have a greater strength, toughness, and long-term durability than electrodes produced according to conventional methods. Accordingly, the performance of devices that use such electrodes is also typically improved. In addition, electrode fabrication in accordance with these methods, in many cases, does not use solvent, thus simplifying the process and reducing its cost.

(ix) Food and Medicine

In some embodiments, the methods disclosed herein are used in the manufacture of foods or medicines. When used to manufacture foods, such as cookies, the composite food materials produced can be resistant to breaking apart during handling, packaging, and/or shipping, an important advantage to reduce waste during manufacturing. During consumption, such food products typically exhibit improved "crunchiness" when eaten and produce less debris (i.e., crumbs) than products produced conventionally.

Pharmaceuticals and other compounds can be packaged in pill form, with the pill casing made from the composite materials disclosed herein. The composite materials typically yield pill casings with improved structural integrity relative to conventional medications. Further, on account of the control over the selection of binder and filler materials allowed by the methods, in addition to control over the fabrication process (i.e., control over the magnitude and manner of pressurization to form the composite materials), a significant degree of control can be achieved over the porosity of the pill casings. Adjustment of the porosity can be used to control the release profile for active pharmaceutical ingredients within the casing.

EXAMPLES

This section provides a number of specific examples to further illustrate the foregoing disclosure, but which are not intended to limit the scope of the disclosure in any manner.

Example 1: Battery Electrodes

Battery electrodes were fabricated using the methods disclosed herein. The active material filler (NCM—provided by TODA AMERICA, with a product number of NCM-04ST), carbon black (CB—TIMCAL C-NERGY SUPER C65), and poly(vinylidene fluoride) (PVDF; provided by SIGMA-ALDRICH, with a product number of 182702-250G) were mixed in a 50 mL beaker in a 93:3:4 ratio with a lab spatula for 5 minutes. The collective weight of the particles was 150 mg. The mixture was then transferred to a cylindrical load cell. The load cell was made of stainless steel and measured ¾" in inner diameter, 2" in height, and 1" in outer diameter. It was equipped with a top piston and a bottom piston; both of the pistons were made of stainless steel, measuring ¾" in diameter and 1" in height. The bottom piston was inserted in the cell, and the NCM-CB-PVDF mixture was placed on top of the bottom piston, inside the steel cell. No solvent was used. The top piston was compressed into the load cell by a type-5582 Instron machine and was used to apply pressure on the NCM-CB-PVDF mixture. The maximum compression pressure was 350 MPa.

Figure 7:
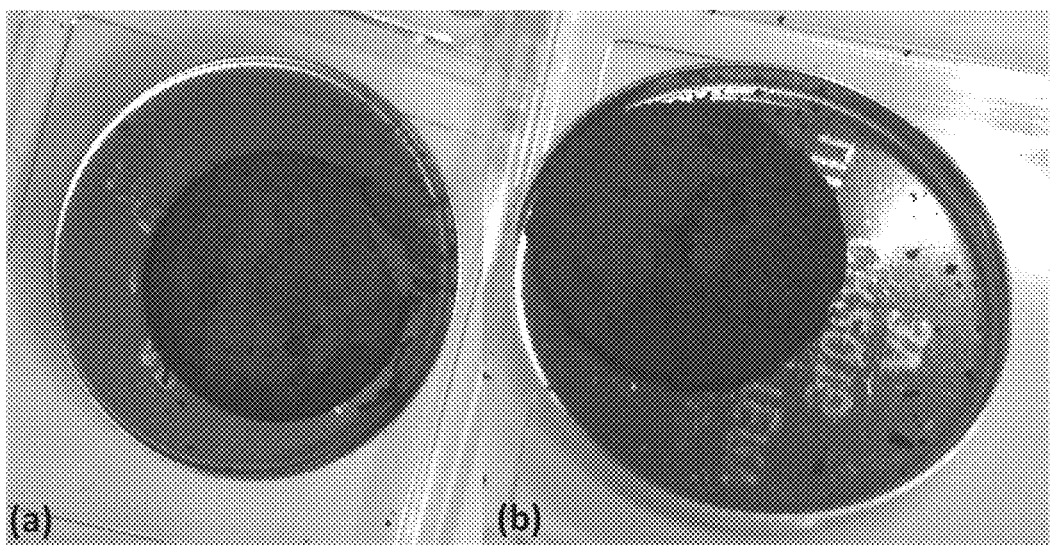
FIG. 7 is an image showing battery electrodes formed of a composite material.

Then, the load cell, including the NCM-CB-PVDF mixture inside and the two pistons, was moved into a CARBOLITE CTF quartz tube furnace. The material was heated up with a heating rate of 20° C./min to 200° C., and this temperature was maintained for 1 hour before the material was air-cooled in the furnace. The heating was performed in an inert atmosphere by purging nitrogen through the quartz tube from an open end. The material in the load cell was taken out. It was a structurally integral disk, and was employed as the electrode in a Type 2016 half-cell. FIG. 7 shows two battery electrodes prepared using this method.

Figure 8:
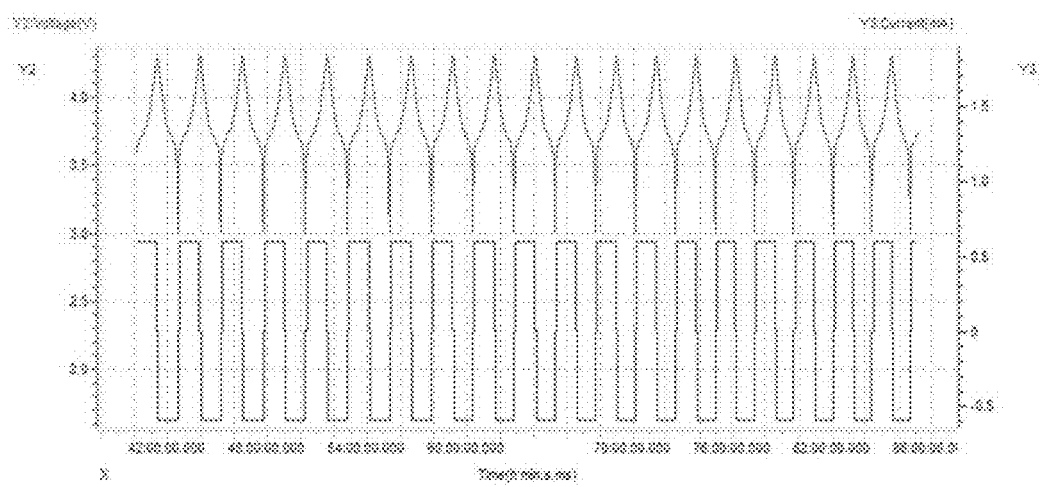
FIG. 8 is a plot showing a charge-discharge curve of one of the battery electrodes of FIG. 7.

A Celgard 2320 trilayer polypropylene-polyethylene (PP/PE/PP) membrane was sandwiched in between the electrode and a 1.1 mm thick, 15.4 mm diameter lithium disk. The membrane thickness was 20 µm. About 30 µl BASF electrolyte (1M LiPF6 in 1:1 EC-EMC) was added into the cell. The assembled battery cells were charged to 4.6 V by a MTI BST8-3 battery analyzer, with a charging rate of C/10. FIG. 8 shows charge-discharge curves of this electrode. The data show that the batteries could be charged and re-charged for multiple cycles, since in each cycle, the battery cell demonstrated a capacity to store and release electric energy.

Example 2: Sand-Polyester Composite Materials—Quasi-Static Mixing

Sand samples were harvested from the Black Beach, San Diego, United States; polyester was purchased from US composites (404 tooling polyester resin-Isophthalic).

The resin and the initiator were mixed with a lab spatula in a 50 mL beaker, with the initiator making up 1.25 weight percent of the mixture. After mixing, a small amount of the polyester resin binder material-initiator mixture was added to 5 g of air-dried sand grains. The resin binder material content was between 2 weight percent to 5 weight percent of the total weight. The sand grains and the resin binder material were premixed for a few minutes in a 50 mL beaker by a lab spatula, and the resulting mixture was transferred into a cylindrical load cell. The load cell was made of stainless steel, with measurements of ¾" inner diameter, 2" height, and 1" outer diameter. It was equipped with a top piston and a bottom piston; both of the pistons were made of stainless steel and had a diameter of ¾" and a height of 1". The bottom piston was inserted in the cell, and the sand-resin mixture was placed on top of the bottom piston, inside the steel cell. The top piston was compressed into the load cell by a type-5582 Instron machine and was used to apply a pressure on the sand-resin binder material mixture. The maximum compression pressure was in the range of 30 MPa to 350 MPa. The compression time was 5 minutes.

After the first loading, the top piston was removed and the compressed sand-resin mixture was transferred into a 50 mL beaker, broken apart by a lab spatula into small grain clusters having a cluster size below 100 μm. The sand-resin binder material mixture was then placed back into the load cell and compressed again by a similar procedure as was used on the first loading.

The compacted material was kept in the load cell, and cured in a VWR (1330GM) box furnace at 215° C. in air for an hour. After curing, the sample was removed from the load cell and cut into beam samples using an MTI high speed diamond cut-off saw. The sample surfaces were polished by a 320 grit sand paper to eliminate surface cracks and roughness.

Figure 9:
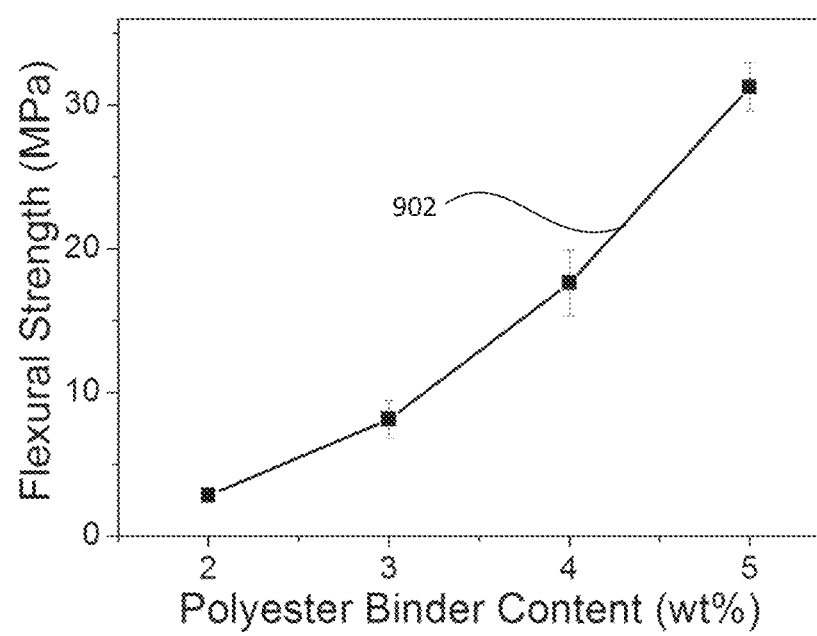
FIG. 9 is a plot of flexural strength as a function of polyester binder content for a composite material that includes a sand filler material and a polyester binder material.
Figure 10:
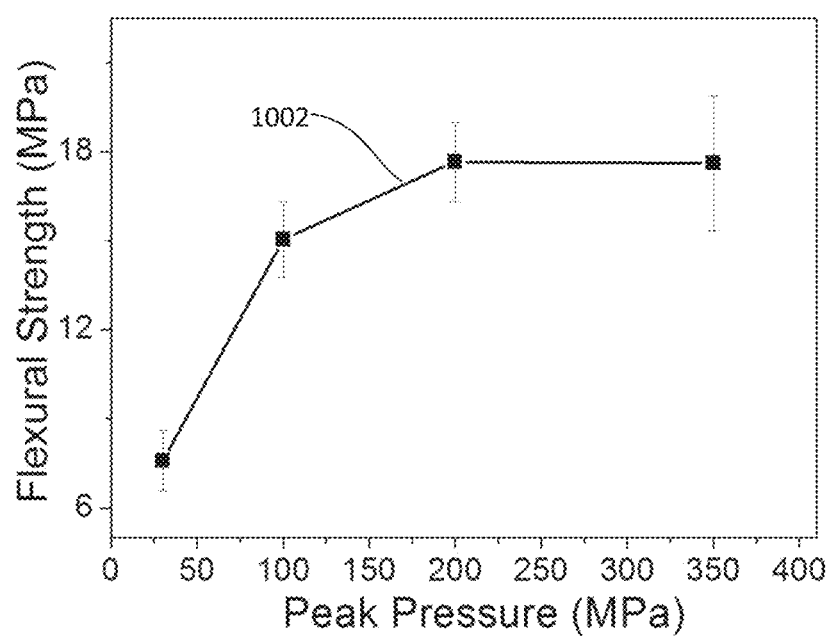
FIG. 10 is a plot of flexural strength as a function of peak compression pressure for a composite material that includes a sand filler material and a polyester binder material.

The flexural strength was measured in a three-point bending setup on the type-5582 Instron machine, in the displacement control mode. The crosshead speed was set to 3.0 mm/min and the span length, L, was set to 19.05 mm. The flexural strength was defined as $R=(3/2)(P_{max}L/bd^2)$, where $P_{max}$ is the maximum load, b is the sample width, and d is the sample height. FIG. 9 shows a plot 902 of the flexural strength of the composite material as a function of polyester binder material content, showing a positive correlation between the two. FIG. 10 shows a plot 1002 of the flexural strength of the composite material as a function of peak compression pressure. FIG. 10 shows a positive correlation between the two variables until about 200 MPa, then exhibited no change with increasing pressure.

Example 3: Sand-Epoxy Composite Material—Quasi-Static Mixing

Composite materials were produced by using epoxy as the binder material. The epoxy resin binder material was EPON 828 provided by Miller-Stephenson Chemical; the hardener was m-xylylenediamine provided by Sigma-Aldrich; the sand sample was collected from the Black Beach, San Diego, United States.

The resin binder material and the hardener were first mixed thoroughly with a lab spatula in a 50 mL beaker, at a weight ratio of 5:1. After mixing, a small amount of the resin binder material-hardener mixture was added to 5 g of air-dried soil grains. The resin binder material content was either 4 weight percent or 5 weight percent of the total weight. The sand grains and the resin binder material were premixed for a few minutes in a 50 mL beaker by a lab spatula, and the resulting mixture was transferred into a cylindrical load cell. The load cell was made of stainless steel, measuring ¾" in inner diameter, 2" in height, and 1" in outer diameter. It was equipped with a top piston and a bottom piston; both of the pistons were made of stainless steel, measuring ¾" in diameter and 1" in height. The bottom piston was inserted in the cell, and the sand-resin binder material mixture was placed on top of the bottom piston, inside the steel cell. The top piston was quasi-statically compressed into the load cell by a type-5582 Instron machine and was used to apply a pressure on the sand-resin mixture, with the loading rate of 0.3 mm/min. The maximum compression pressure was either 100 MPa or 350 MPa. The compression time was 5 minutes.

After the first loading, the top piston was removed and the compressed material was transferred into a 50 mL beaker and broken apart by a lab spatula into small grain clusters. The mixture was then placed back into the load cell and compressed again, with the same loading rate, maximum pressure, and compression time as the first loading. The compacted material was kept in the load cell, and cured in a VWR (1330GM) box furnace at 100° C. in air for an hour.

Figure 11:
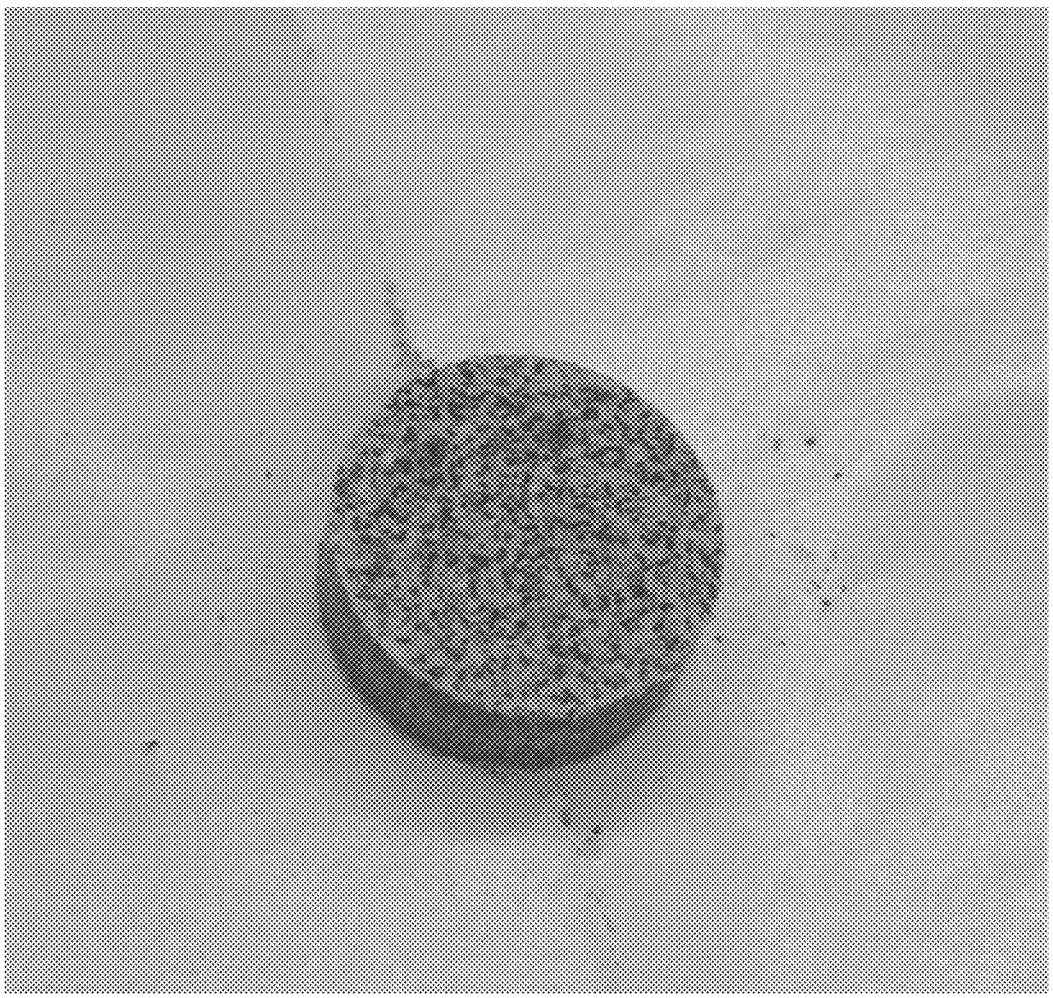
FIG. 11 is an image of an example of a composite material that includes a sand filler material and an epoxy binder material.
Figure 12:
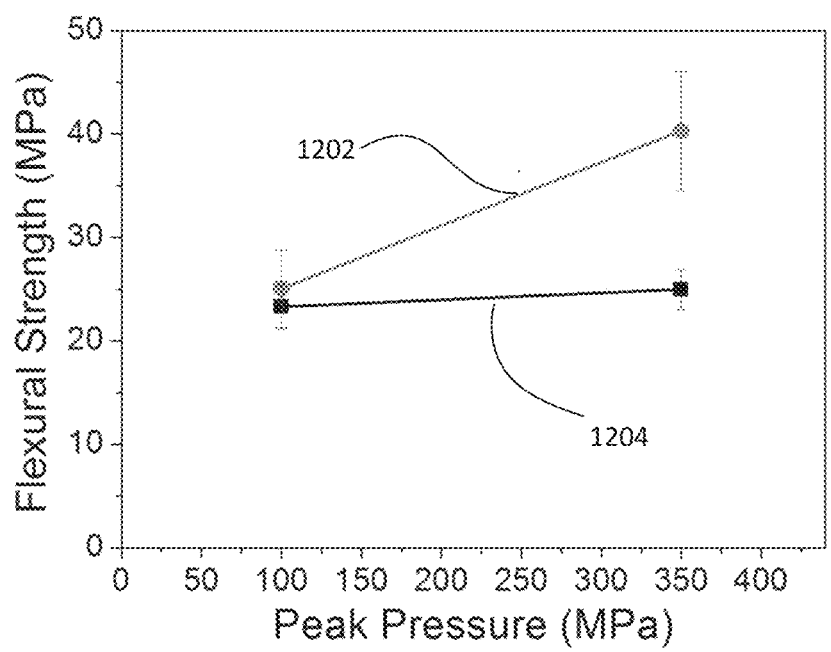
FIG. 12 is a plot of flexural strength as a function of peak compression pressure for two composite materials, each including a sand filler material and an epoxy binder material.

After curing, the material was removed from the load cell and cut into beam samples using an MTI high speed diamond cut-off saw. The sample surfaces were polished by a 320 grit sand paper to eliminate surface cracks and roughness. FIG. 11 shows an image of the composite material sample produced. The flexural strength was measured in a three-point bending setup on the type-5582 Instron machine, in the displacement control mode, similar with the testing procedure in Example 2. The crosshead speed was set to 3.0 mm/min and the span length, L, was set to 19.05 mm. FIG. 12 shows plots of flexural strength as a function of peak pressure used in the method. In FIG. 12, plot 1202 represents the composite material including 5 weight percent binder, and plot 1204 represents the composite material including 4 weight percent binder. FIG. 12 shows that the flexural strength of the composite material had a higher positive correlation with peak pressure with the higher epoxy binder material content.

Example 4: Soil-Epoxy Composite Material—Quasi-Static Mixing

Another composite material was produced, using soil as the filler material. The soil was collected from the Merriam Crater, Ariz., and air-dried. The epoxy binder material and the hardener were the same as that of Example 3. The resin-hardener mixing, filler material-binder material premixing, first compression, breaking apart of the composite material, second compression, curing, cutting, polishing, and flexural strength measurement procedures were the same as that of Example 3. The resin binder material content was either 2.5 weight percent or 4 weight percent of the total mass; the compression pressure was in the range from 10 MPa to 350 MPa.

Figure 13:
FIG. 13 is an image of an example of a composite material that includes a soil filler material and an epoxy binder material.
Figure 14:
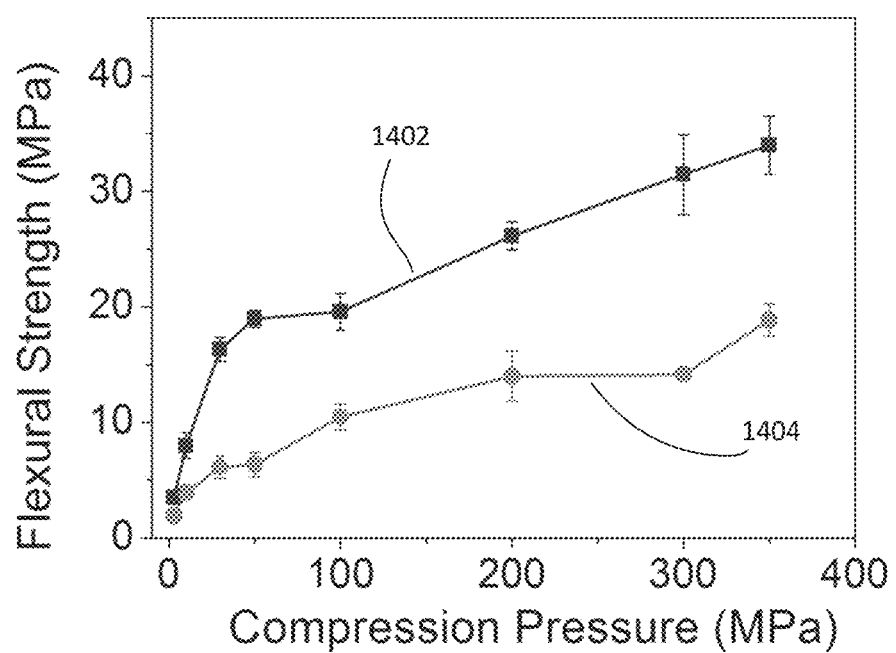
FIG. 14 is a plot of flexural strength as a function of peak compression pressure for two examples of composite materials, each including a soil filler material and an epoxy binder material.

FIG. 13 is an image of the composite material produced. FIG. 14 shows the flexural strength of the composite material as a function of compression pressure. In FIG. 14, plot 1402 represents the composite material that includes 4 weight percent binder material, and plot 1404 represents composite material that includes 2.5 weight percent binder material. Overall, a higher epoxy binder material content and a higher compression pressure result in composite materials with higher flexural strength.

Example 5: Soil-Epoxy Composite Material, with a Controlled Grain Size Distribution Another composite material was produced, using the same soil, epoxy resin binder material, and hardener as were used in Example 3.

Three groups of soils (designated A, B, and C) of different grain size distributions were tested. A sieve analysis was performed by using a W.S. Tyler Ro-Tap RX29 machine, with a shake table, a sieve holder, and a foldable protective case. The shake frequency was ~278 per minute, with a two-dimensional circular displacement of 1" by 0.75", at 150 taps per minute. The hammer weight was 5 lbs.

The sieves stack consisted of 6 sieves with a top cover and a bottom pan. The grid sizes of the sieves were 560 µm, 500 µm, 112 µm, 90 µm, 25 µm, and 20 µm, respectively, ordered from the top to the bottom. Thus, three different size ranges of soil grains were obtained: 500-560 µm, 90-112 µm, and 20-25 µm.

Group A contained only the soil grains with the grain sizes of between 500-550 µm. Group B filler material contained soils within grain sizes ranging from 500-560 µm, 90-112 µm, and 20-25 µm (two stepped particle gradation), with a mass ratio of 67:219:714. Group C contained original soil grains without sieve analysis (i.e., the grain size distribution was as-received and with random particle size). The soils were air-dried.

Figure 15:
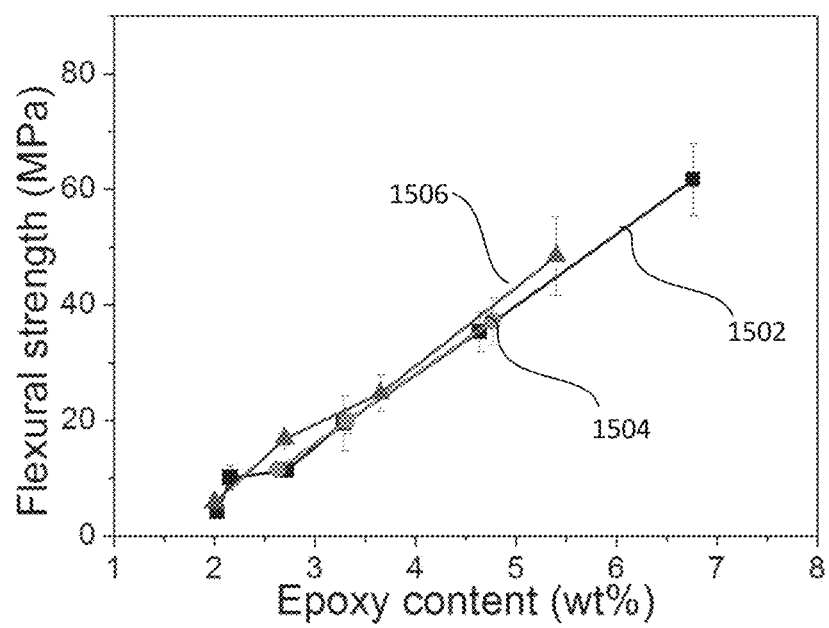
FIG. 15 is a plot of flexural strength as a function of epoxy content for two examples of composite materials, each including a soil filler material and an epoxy binder material.

The resin-hardener mixing, mixing of the filler material and the binder material, first compression, breaking apart of mixture, second compression, curing, cutting, polishing, and flexural strength measurement procedures were the same as in Example 3. The resin content was in the range of 2-7 weight percent of the total mass and the compression pressure was 350 MPa. FIG. 15 shows plots of the flexural strength as a function of epoxy content for the composite materials prepared. Plot 1502 represents the composite material made with soil filler material having 500 µm uniform particle size, plot 1504 represents the composite material made with soil filler material having two-stepped particle size gradation, and plot 1506 represents the composite material made with soil filler material having random particle size. Overall, incorporating more epoxy binder material resulted in materials with a higher flexural strength.

Example 6: Sand-Epoxy Composite Material, with Aggregates

Another composite material was produced, using the same soil and binder material as was used in Example 4 was used. Gravel purchased commercially was employed as the aggregate. The average gravel particle size was around ⅜ inch. The gravels were air-dried. Two groups of gravels were tested. Group A was brush-coated by a thin layer of epoxy-hardener mixture; the epoxy-hardener mixture was the same as the resin premixed with the filler material soil; the amount of the resin coating was around 5 mg/cm². Group B gravels were uncoated.

The procedures of resin-hardener mixing, filler material-binder material premixing, first compression, and breaking part of mixture were the same as in Example 4. The compression pressure was 350 MPa. The soil-resin mixture was then mixed for one minute with 9 g of Group A or Group B gravels using a lab spatula. The mixture was placed back into the load cell and compressed again at the same loading rate, the same maximum pressure, and the same compression time as the first loading. The compacted material was kept in the load cell and cured in a VWR-1330GM box furnace at 100° C. in air for an hour. The overall binder material content was 2.6 weight percent of the total mass of the material containing Group A gravels, and 1.4 weight percent for the material containing Group B gravels.

Figure 16:
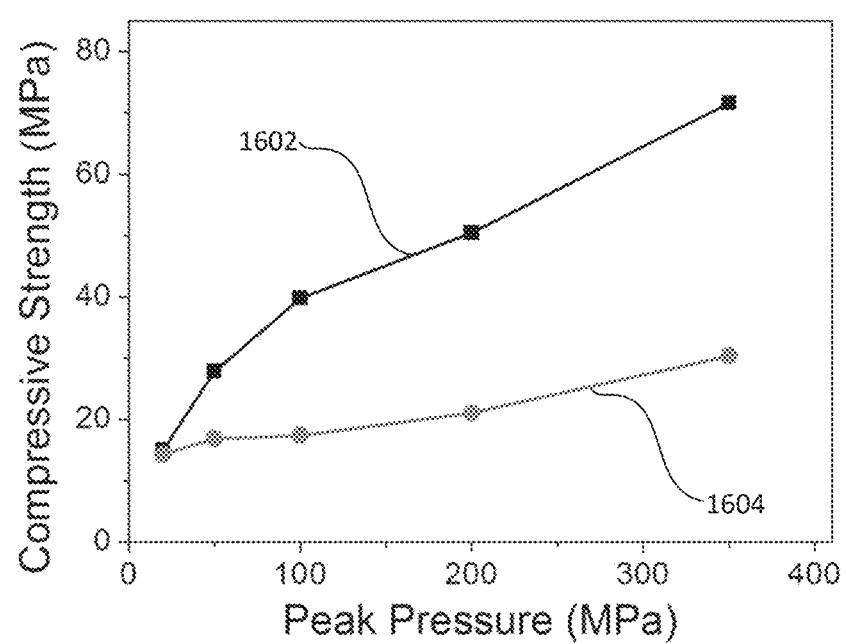
FIG. 16 is a plot of compressive strength as a function of peak compression pressure for two examples of composite materials that include a sand filler material and an epoxy binder material, in combination with a gravel aggregate material.

After curing, the samples were removed from the load cell and air-cooled to room temperature. The samples were cylinders having a diameter of ¾" and a height of ~1.5". The compressive strength was measured by crushing the cylinder using a Type-5582 Instron machine, at a loading rate of 1 mm/min. The compressive strength was defined as $F_{max}/A_0$, where $F_{max}$ is the peak compressive force at which the cylinder fails, and $A_0$ is the initial cross-sectional area of the cylinder. FIG. 16 shows plots of the compressive strength as a function of peak pressure. Plot 1602 represents the composite material that includes surface resin on the aggregate (Group A), and plot 1604 represents the composite material that includes no surface resin on the aggregate (Group B). The plots indicate a higher positive correlation between compressive strength and peak pressure of the composite material that includes surface resin on the aggregate relative to the composite material with no surface resin on the aggregate.

Example 7: Soil-PEKK Composite Material

Another composite material was produced, using the same soil as was used in Example 4 as the filler material. The binder material was a thermoplastic material, polyetherketoneketone (PEKK) (KEPSTAN 6002PL), which was provided by Arkema in powder form, having a particle size of ~50 µm.

Figure 17:
FIG. 17 is an image of an example of a composite material that includes a soil filler material and a polyetherketoneketone binder material.
Figure 18:
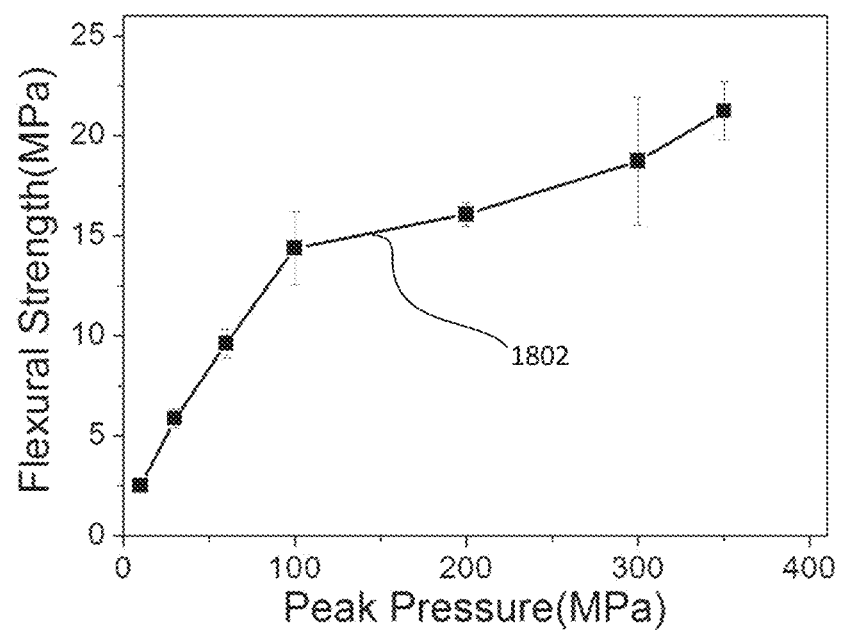
FIG. 18 is a plot of flexural strength as a function of peak compression pressure for an example of a composite material that includes a soil filler material and a polyetherketoneketone binder material.

The PEKK powders were mixed with about 5 g of air-dried soil grains in a 50 mL beaker with a lab spatula. The polymer content was set as 4 weight percent of the total weight. The mixture was then moved into the same steel cell as was used in Example 4. At room temperature, the top piston was compressed into the steel cell by a type-5582 Instron machine, with a loading rate of 0.3 mm/min. The maximum compression pressure varied in the range from 10 to 350 MPa. After holding the pressure for 5 minutes, the steel cell, including the material inside and the two pistons, was moved into a quartz tube furnace. The material was heated at a heating rate of 20° C./min to the set point, and this temperature was maintained for 1 hour. The heating was performed in an inert atmosphere by purging nitrogen through the quartz tube from an open end. The set point was 400° C. Then, the material was furnace-cooled to room temperature, taken out of the steel cell, and cut into beam samples using an MTI high speed diamond cut-off saw. The sample surfaces were polished by 320 grit sand paper to reduce surface cracks and roughness. FIG. 17 shows an image of the PEKK-based sample. The flexural strength was measured in a three-point bending setup, similar to the procedure in Example 5. Plot 1802 in FIG. 18 shows that the flexural strength increases as a function of peak pressure in the composite material having 4 weight percent of binder material.

Example 8: Impact Mixing (IM)

Another composite material was produced, using impact mixing (IM) and the same soil filler material and epoxy binder material as was used in Example 4.

The epoxy resin binder material and the hardener were first mixed together with a lab spatula in a 50 mL beaker with a weight ratio of 5:1. After mixing, a small amount of epoxy-hardener mixture was added to about 5 g of air-dried soil grains. The resin content was 4 weight percent of the total weight of the epoxy-hardener mixture. The stimulant-resin mixture was transferred into the steel cell the same as was used in Example 4. The steel cell was placed into an Instron CEAST 9350 impact machine, where a hammer was dropped to impact the soil-epoxy binder material mixture through the top piston. The hammer mass was in the range from 2.77 kg to 5.77 kg, adjusted by 0.5 kg and 1 kg weights. An accelerometer embedded in the hammer measured the deceleration of the hammer, from which the impact force could be calculated. The drop distance of the hammer was in a range of 20 cm to 1 m.

Multiple impacts were conducted on the soil-epoxy binder material mixture. Between two impacts, the top piston of the steel cell was removed and the compressed material was transferred into a 50 mL beaker, broken apart by a lab spatula into small pieces with the size below 100 μm, and placed back into the steel cell; then, the top piston was placed back and the steel cell was placed into the drop tower again. The number of impacts ranged from 2 to 5.

Figure 19:
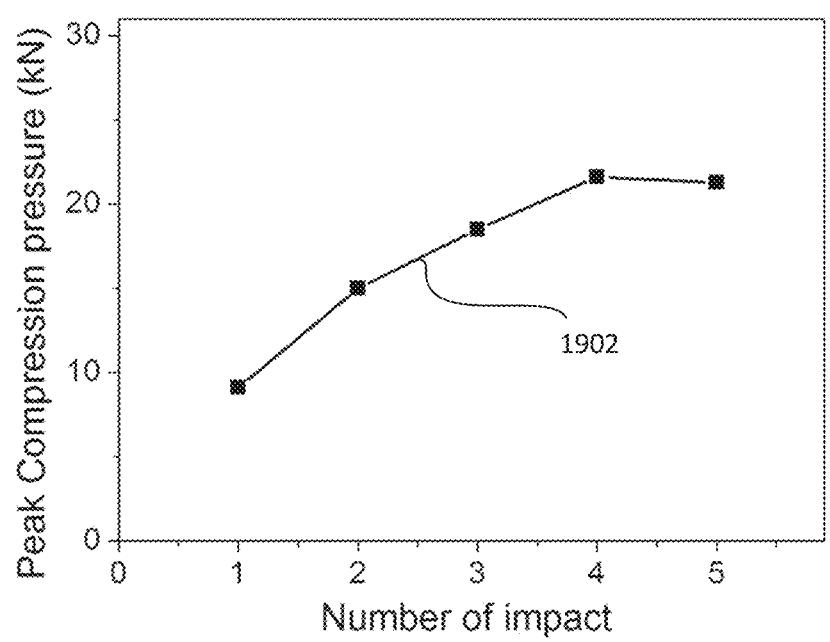
FIG. 19 is a plot of peak compression pressure as a function of the number of impacts for an example of a composite material that includes a soil filler material and an epoxy binder material.
Figure 20:
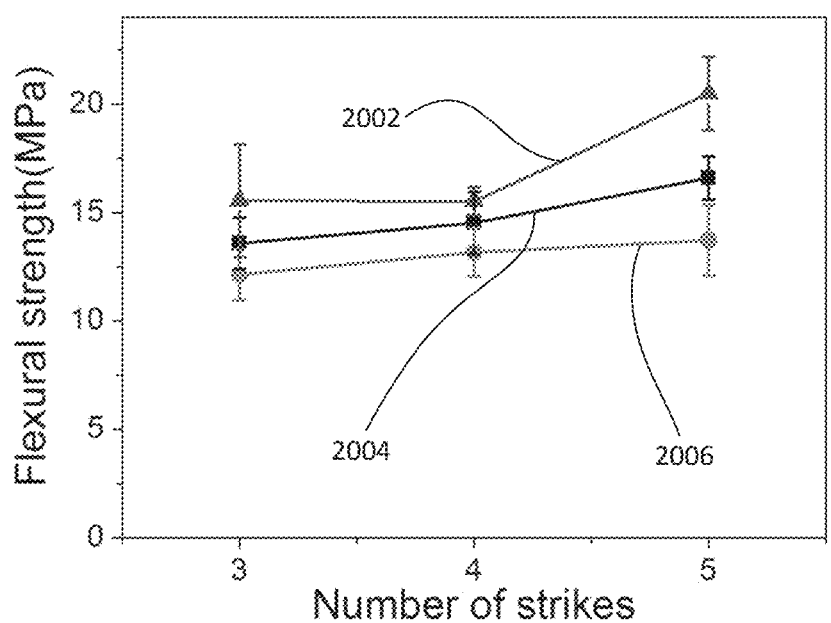
FIG. 20 is a plot of flexural strength as a function of the number of impacts for three examples of composite materials that include a soil filler material and an epoxy binder material.

After completing the impacts, the material was kept in the steel cell and cured in a VWR-1330GM box furnace at 100° C. in air for one hour. After curing, the sample was removed from the steel cell and cut into beam samples using an MTI high speed diamond cut-off saw. The sample surfaces were polished by a 320 grit sand paper. The flexural strength was measured in a three-point bending setup, similar to how it was measured in Example 4. FIGS. 19 and 20 show the peak compression strength and the flexural strength, respectively, as a function of the number of strikes. FIG. 19 is a plot 1902 of peak compression strength of the composite material after repeated pressurization, as a function of number of impacts. According to FIG. 19, there is a positive correlation between peak compression pressure and the number of impacts up until 4 impacts, after which a low correlation or a slight negative correlation was observed. In FIG. 20, plot 2002 represents the flexural strength of a composite material following fabrication by repeated cycles of impact pressurization with a hammer velocity of 2.0 m/s, a hammer mass of 5.77 kg, and 11.5 J/strike. Plot 2004 represents the flexural strength of a composite material following fabrication by repeated cycles of impact pressurization with a hammer velocity of 3.0 m/s, a hammer mass of 2.77 kg, and 12.5 J/strike. Plot 2006 represents the flexural strength of a composite material made using a hammer velocity of 2.4 m/s, a hammer mass of 4.27 kg, and 12.3 J/strike. All three plots show a positive correlation between flexural strength and number of pressurization strikes.

Example 9: Glass-Epoxy Composite Material

Figure 21:
FIG. 21 is an image of an example composite material that includes a glass filler material and an epoxy binder material.

Another composite material was produced using the same binder material as in Example 4. The resin-hardener mixing, premixing, first compression, breaking apart of mixture, second compression, and curing procedures were the same as those in Example 4, except that the filler material was glass beads obtained from Sigma-Aldrich (Product No. G9268). The glass particle size was 425-600 μm. The epoxy binder material content was 4 weight percent of the total mass; the compression pressure was 350 MPa. FIG. 21 shows an image of the composite material produced by this method.

Example 10: Improved Fluidity of Resin

During the premixing and pressure application steps of the methods disclosed herein, the fluidity of the binder material can be improved by adding a diluent that includes, for example, a solid, a liquid, a gas, a foaming agent, and/or a bubble-generating agent. A composite material was produced using the same sand and epoxy binder material as in Example 3, incorporating the use of a diluent. The epoxy resin binder material and the hardener were first mixed with a lab spatula in a 50 mL beaker at a weight ratio of 5:1. Then, ethanol was added to the resin-hardener mixture, and mixed with a lab spatula for 1 minute. The ethanol was obtained from Fisher Scientific (Product No. A407-4). The volumetric ratio of epoxy to ethanol was 1:1. After mixing, a small amount of the epoxy-ethanol mixture was added to about 5 g of air-dried sand grains. The epoxy binder material content was 2 weight percent of the total weight of the resulting mixture. The sand grains and the epoxy-ethanol mixture were mixed for a few minutes in a 50 mL beaker by a lab spatula, and then transferred into the same steel cell as was used in Example 3. The quasi-static mixing, curing, cutting, polishing, and flexural strength measurement procedures were performed the same way as in Example 3. The quasi-static mixing pressure was 350 MPa. The flexural strength of the resulting composite material was 12 MPa.

Example 11: Using Recycled Materials as Filler Materials/Reinforcements

As discussed previously, a wide variety of different filler materials can be used in the composite materials disclosed herein. For example, in some embodiments, the filler materials can be recycled materials. Recycled materials can also be used as reinforcing materials in the composite materials.

Figure 22:
FIG. 22 is an image of an example composite material that includes a wood chip filler material and an epoxy binder material.

Another composite material was produced, using the same epoxy binder material as in Example 3, with recycled wood chips as filler materials. The wood chips were generated from sawing pine wood, and had a size of about ¼" to ¾". The premixing, pressure step, curing, cutting, polishing, and flexural strength measurement procedures were performed in the same way as in Example 3. The pressure was 350 MPa; the binder material content was 5 weight percent. FIG. 22 shows a photo of the composite material produced. The flexural strength of the material was 11 MPa.

Example 12: Binder Material Formed Through In Situ Polymerization

As discussed above, various polymers can be used as binder materials in the composite materials disclosed herein. When polymers are used as binder materials, monomer precursors can be added to the mixture containing the filler materials, and the monomers can be polymerized in situ to form the binder materials during fabrication.

Another composite material was produced, using methyl methacrylate (MMA) provided by Sigma-Aldrich (Product No. M55909), and the free radical initiator benzoyl peroxide (Sigma-Aldrich Luperox; product no. 517909). The filler material was the same soil as in Example 4.

The MMA and initiator were first mixed by a lab spatula in a 50 mL beaker, at a weight ratio of 50:1. After mixing, a small amount of the MMA-initiator mixture was added to about 5 g of air-dried soil grains. The binder material content was 4 weight percent, 6 weight percent or 8 weight percent of the total weight. The soil grains and the MMA-initiator mixture were mixed for 1 minute in a 50 mL beaker by a lab spatula, and this resulting mixture was transferred into the same steel cell as in Example 4. The quasi-static mixing procedure was the same as in Example 4. The applied pressure was 350 MPa.

The compacted material was kept in the steel cell, with the piston remaining in place, and cured in a VWR (1330GM) box furnace at 80° C. in air for 36 hours in order to polymerize the MMA into poly(methyl methacrylate) (PMMA).

After curing, the sample was removed from the load cell and cut into beam samples using an MTI high speed diamond cut-off saw. The sample surfaces were polished with 320 grit sand paper. The flexural strength measurement procedure was the same as in Example 4. At 4, 6, and 8 weight percent binder material, the flexural strengths of the materials were 20 MPa, 31 MPa and 37 MPa, respectively.

Example 13: Thermally-Responsive Coatings for Electrodes

Thermally-responsive coatings were produced for battery electrodes. The thermally-responsive composite material coatings (TRCMCs) included about 90% by weight of particle filler material, about 1% by weight of conductive additive filler material, and about 9% by weight of polymer binder material. The particle filler material was silica (Sigma-Aldrich S5631, Silicon Dioxide) or montmorillonite (Alfa Aesar L15160, Montmorillonite K10). The conductive additive filler material was carbon black (TIMCAL C-NERGY Super-C65). The polymer binder material was poly(vinylidene fluoride) (Sigma-Aldrich 427152, PVDF). The three components were first mixed together in an agate mortar at room temperature for 40 minutes. After mixing, N-methyl-2-pyrrolidone (2 mL per gram of filler material-binder material mixture, Sigma-Aldrich 270458) was added. Slurry mixing was performed by a Qsonica Q55 ultrasonic probe for 10 minutes. The resulting slurry was spread onto an aluminum current collector using a doctor blade. The aluminum current collector was obtained from MTI (Product No.: EQ-bcaf-15u-280), had a thickness of 15 m, and had been cleaned beforehand with acetone. The initial thickness of the slurry was ~25 µm. The slurry was then dried in a vacuum oven at 80° C. for 20 hours, resulting in a reduction of the thickness of the slurry layer to 7-8 µm. The coated current collector was compressed by a hardened steel double-roller under a pressure exceeding 10 MPa, with the final TRCMC thickness being ~4 µm.

Figure 27A:
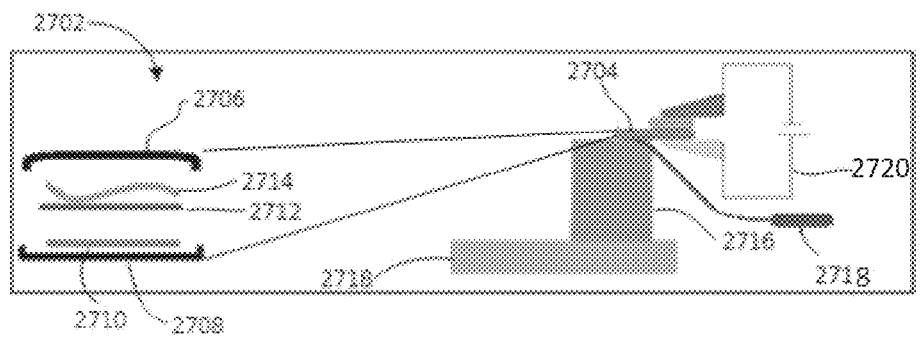
FIGS. 27A-27C are schematic diagrams showing cross-sectional views of a coin cell including thermally responsive composite material connected to a battery while atop a heating element, a battery coin cell including a layer of thermally responsive composite material, and a nail penetrating a battery coin cell, respectively.

The TRCMC-coated current collector was cut into 9/16"-diameter discs, and directly assembled into CR2016 coin cells. FIG. 27A shows a schematic diagram of a coin cell 2704 in contact with a heat source 2718 and a voltage source 2720. An exploded view 2702 of the coin cell is also shown in FIG. 27A. In the exploded view, the CR2016 top case 2706 and bottom case 2708 house aluminum current collector 2710, which is covered with the TRCMC composite material. The mass of the TRCMC composite material was approximately 1 mg in each current-collector cell sample. About 5 µL electrolyte (BASF LP50 Selectilyte) was added to each cell. A stainless steel spacer 2712 and a spring 2714 were used to stabilize the current collectors. A reference sample was prepared with a similar structure, except that the current collector was not coated with the TRCMC material.

The coin cell sample was placed on a steel rod 2716 on heat source 2718 (a hot plate), and voltage source 2720 (a CR1060 commercial battery cell) was connected to it. Voltage source 2720 applied a voltage of about 4.2 V across current collector 2710. Coin cell 2704 was connected to a MTI BST8-3 Battery Analyzer, and was heated to 140° C., while the temperature was measured at the bottom surface of the coin cell by an Omega TT-K-40-25 type-K gage-40 thermocouple connected to an Omega OM-EL-USB-TC temperature logger; the tip of the thermocouple was affixed to the center of the bottom surface of the coin cell.

Figure 28:
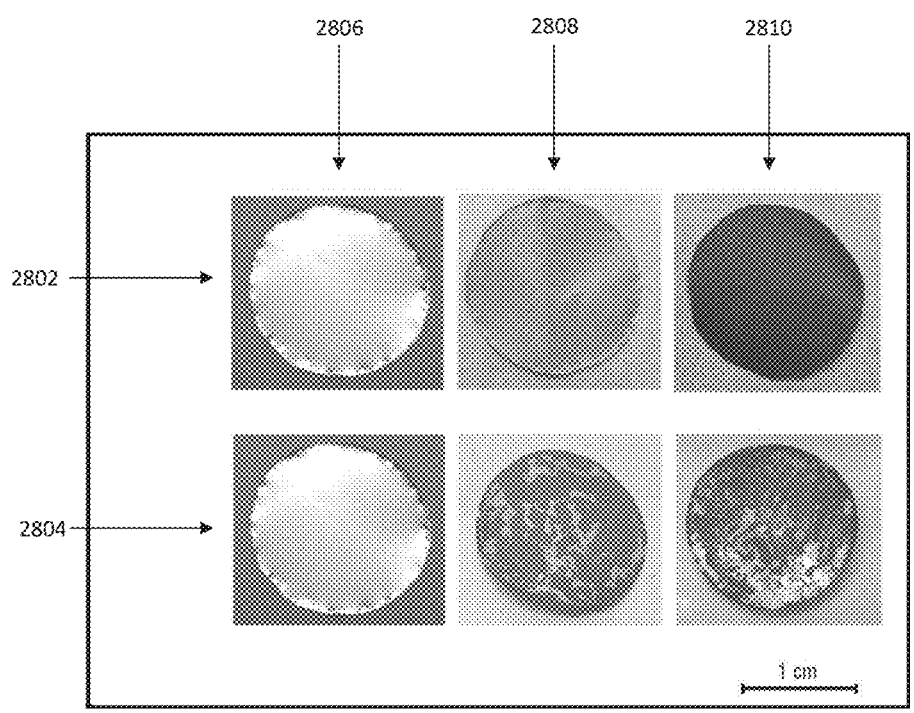
FIG. 28 is an image showing examples of current collectors coated with a composite material before and after abuse testing.

The temperature and the voltage were maintained for about 5 min. Then, the cell was air-cooled and opened. FIG. 28 is an image of three current collectors before (row 2802) and after (row 2804) the thermal testing. In the reference sample (the current collector without the TRCMC material, column 2806), the current collector showed no discernible changes after the test. Both current collectors with montmorillonite- (column 2808) and silica-based (column 2810) TRCMCs were disintegrated after the test, indicating that the damage to the TRCMC materials was thermally triggered, and therefore that the TRCMC materials function as current limiting sacrificial materials when the cell is exposed to elevated temperatures.

To produce battery cells, active electrode material (AEM) layers were coated on top of TRCMC-coated current collectors. The AEM layer (middle layer inside housing) consisted of 93% by weight of active material (NCM—provided by TODA AMERICA, with a product number of NCM-04ST), 4% by weight of polymer binder material, and 3% by weight of conductive additive. The active material was Li—NiCoMn (TODA America NCM-04ST). The polymer binder material was poly(vinylidene fluoride) (Sigma-Aldrich 182702). The conductive additive was carbon black (TIMCAL C-NERGY Super-C65).

The slurry processing of the AEM layers was performed in the same manner to the TRCMC. The wet AEM slurry was first coated on top of clean current collectors (for reference samples) or TRCMC-coated current collectors (for TRCMC-modified samples). The initial layer thickness of the AEM was about 220 µm. After drying at 80° C. in a vacuum oven for 20 hours, the dried electrode film thickness was about 100 µm. The dried electrode film was then compressed by a hardened steel double-roller, similar to the TRCMC layer processing. The final layer thickness of the AEM was about 80 µm. The electrode film was cut into 9/16"-diameter discs, and assembled into CR2016 coin cells. The mass of active material was approximately 35 mg in each coin cell.

Figure 27B:
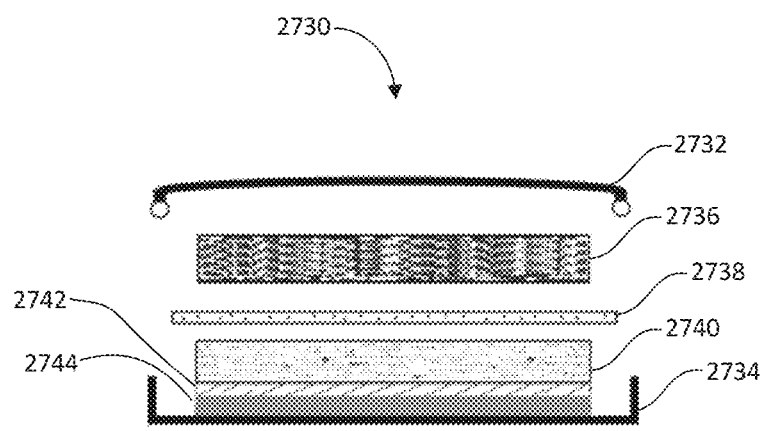

FIG. 27B shows a schematic diagram of a coin cell 2730 produced as described above. In FIG. 27B, the top case 2732 and bottom case 2734 house the inner components. The negative electrode 2736 was a 1.1-mm-thick lithium foil, with a diameter of ½". The membrane separator 2738 was a 25-µm-thick porous trilayer polymer film (Product No. 2325 from Celgard). The active material 2740 layer was positioned between membrane separator 2738 and TRCMC layer 2742. Current collector 2744 was positioned on the opposite side of TRCMC layer 2742.

The battery coin cell was first cured for 5 hours. Then, the battery coin cell was cycled between 4.3-3.0 V at C/10 in an MTI BST8-3 Battery Analyzer for one cycle and between 4.2-3.0 V for 15 additional cycles at C/2, and finally charged to 4.6 V at C/10. The charged battery coin-cells were pre-heated on a hot plate at 110° C. for 1 minute, air-cooled to room temperature, and fully charged to 4.6 V again at C/10.

Figure 27C:
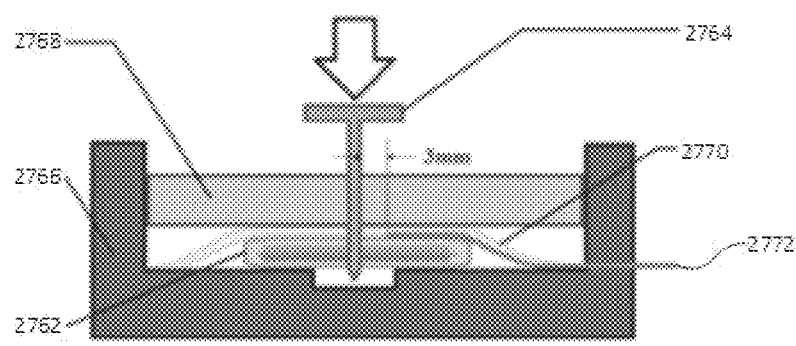

To evaluate the response of the coil cell to mechanical abuse, the coil cell was subjected to penetration by a nail. FIG. 27C is a schematic diagram of a pre-heated coin cell 2762 during penetration by a stainless steel nail 2764. The radius of curvature of nail tip was 0.8 mm, and the nail was driven through the center of the coin cell by a Palmgren bench vise. The temperature was measured by an Omega TT-K-40-25 type-K gage-40 thermocouple connected to an Omega OM-EL-USB-TC temperature logger, with the tip of the thermocouple affixed on the top surface of the coin cell 2762, 2.5 mm displaced from the center. The coin cell was insulated by a polyurethane holder 2766 and cover 2768 during the nail penetration test. Insulating tape 2770 was placed over the coin cell 2762, and the thermocouple 2772 used for temperature measurement contacted the top surface of the coin cell.

Figure 29:
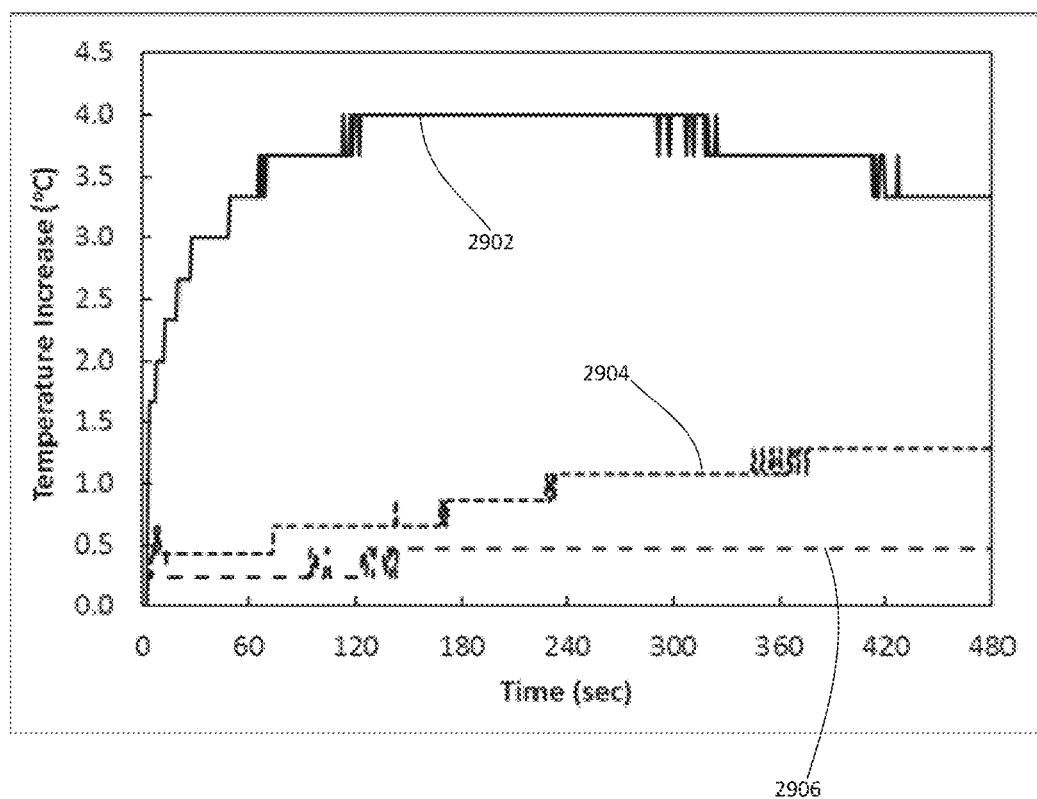
FIG. 29 is a plot of temperature increase as a function of time of a reference battery cell, a battery cell including a composite material that includes montmorillonite, and a battery cell including a composite material that includes silica.

FIG. 29 shows plots of temperature increase as a function of time for a reference battery cell without a TRCMC (plot 2902), a battery cell with montmorillonite-based TRCMC (plot 2904), and a battery cell with silica-based TRCMC (plot 2906). The plots show that the battery cells with TRCMCs, upon nail penetration, exhibit much lower temperature increases, indicating that TRCMCs can be used in battery cells and other electronic devices to mitigate excess internal temperatures than might otherwise occur as a result of mechanical perturbations.

Figure 30A:
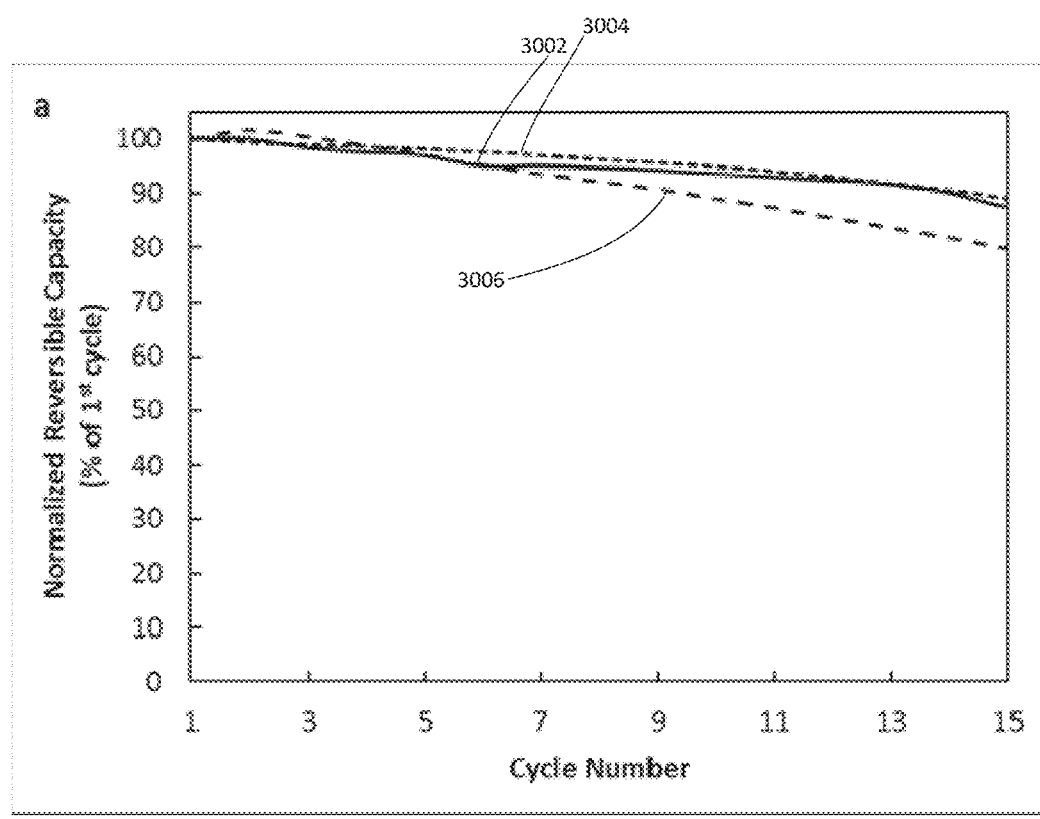
FIGS. 30A-30B are plots of normalized reversible capacity as a function of cycle number, and reversible capacity as a function of cycle number, respectively, of a reference battery cell and battery cells that include a composite material.

FIG. 30A shows plots of normalized reversible capacity as a function of cycle number for a reference battery cell without a TRCMC (plot 3002), a battery cell with montmorillonite-based TRCMC (plot 3004), and a battery cell with silica-based TRCMC (plot 3006). FIG. 30A shows that the cycling performance of TRCMC-modified battery coin cell was comparable with that of reference coin cells without TRCMCs. The data shown in FIG. 30A were measured without pre-heating the cells. The first-cycle reversible capacities of the reference cell and the cells with montmorillonite-based and silica-based TRCMCs were respectively 114 mAh, 133 mAh, and 82 mAh per gram of active material.

Figure 30B:
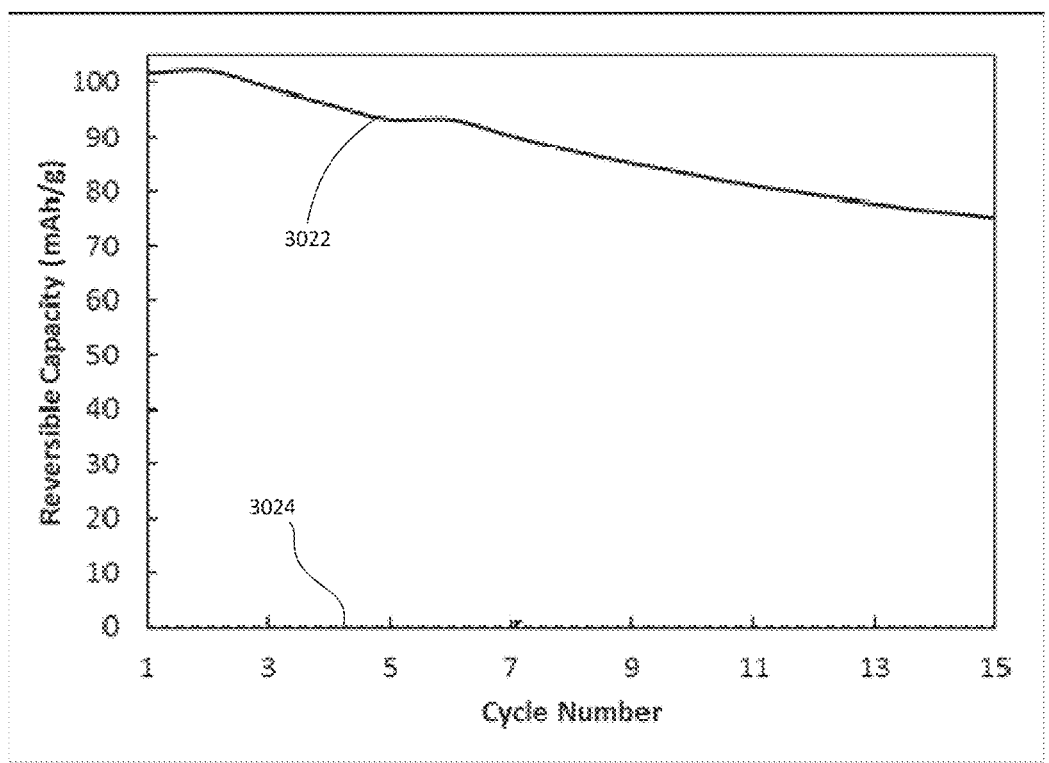

FIG. 30B depicts plots of reversible capacity as a function of cycle number for a reference battery cell without a TRCMC (plot 3022) and a battery cell with montmorillonite-based TRCMC (plot 3024). Comparison of the plots in FIG. 30B shows that after pre-heating, the TRCMC-modified coin cell could not be charged or discharged, indicating that internal damage had taken place at the pre-heating temperature. These results demonstrate that TRCMCs are thermally responsive, and can prevent damage to other components of the cells by undergoing a large increase in their effective internal impedance upon exposure to excessive temperatures (i.e., during pre-heating). When the impedance of the TRCMCs increases, large currents cannot flow within the battery cell, and the cell's other components are thereby protected from temperature-related damage.

Example 14: Mitigating Liquefaction

Soil liquefaction can result in significant damage to buildings and structures that are supported by the liquefying soil. By using a small amount of polymer binder material, the soil can be significantly strengthened, thus mitigating soil liquefaction and helping to prevent associated structural damage to the buildings.

The same soil and the same epoxy-hardener binder material mixture as in Example 4 were used to fabricate another composite material. The epoxy resin binder material and the hardener were first mixed by means of a lab spatula in a 50 mL beaker, at a weight ratio of 5:1. After mixing, 35 grams of the soil was placed into a 50 mL beaker. The soil was separated from the inner wall of the beaker by aluminum foil. A small amount of epoxy-hardener mixture was diluted by ethanol, and poured onto the soil from the top. The polymer content was 5 weight percent of the soil weight; the polymer-ethanol volume ratio was 1:1. The soaked soil was at rest in air for 2 days at room temperature.

Figure 23:
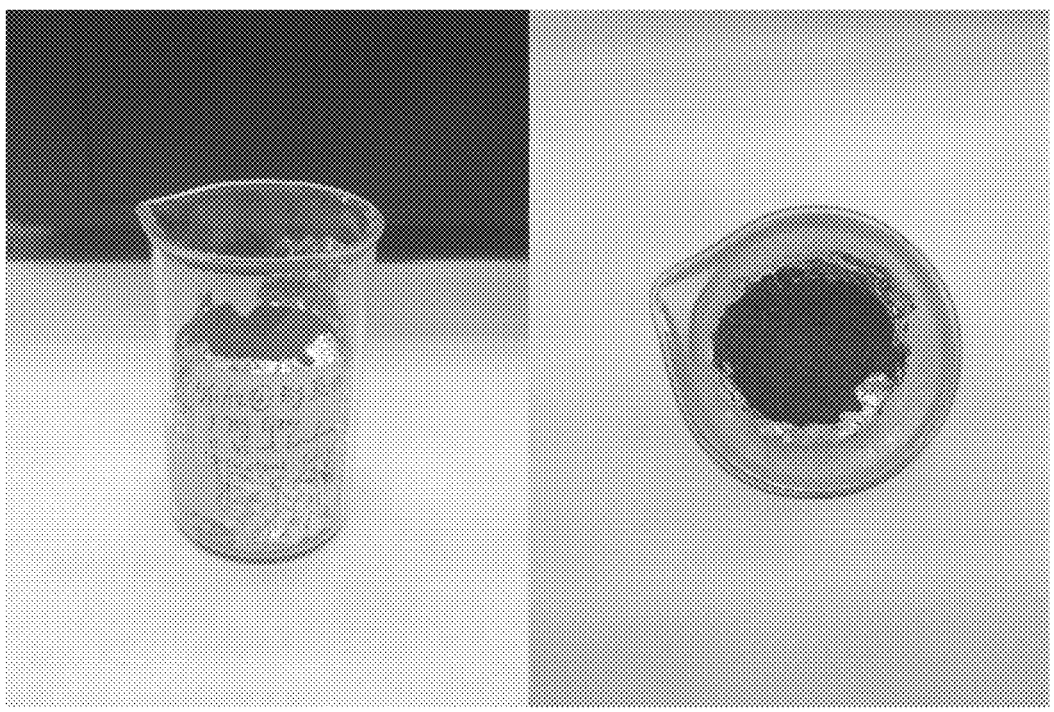
FIG. 23 is an image of an example composite material that includes a soil filler material and an epoxy binder material.

FIG. 23 shows an image of the resulting composite material, which was structurally integral. Beam samples were cut, polished, and their flexural strengths were measured, following the same procedure as in Example 4. The flexural strength was 2 MPa. The hardened soil was also tested under simulated environmental conditions by washing it in a stream of water for 10 min. The flow rate of the stream was 1 L/min and the soil composite material sample mass was 35 g. The weight loss of the soil was less than 1%.

Example 15: Solvent-Aided Binder Material Mixture and Food/Medicine Production

Carboxymethylcellulose (CMC) is used in the pharmaceutical industry as a water-soluble and biocompatible binder material for medications. Composite materials can readily be produced using the methods disclosed herein using carboxymethylcellulose sodium as the binder material. In this example, a filler material consisting of powder ground and harvested from an Oreo® cookie was used.

Carboxymethylcellulose sodium was first mixed with water at a 50:50 mass ratio in a 50 mL beaker. A small amount of this mixture was applied to 5 g of ground cookie powder. The binder material content was 5 weight percent of the total weight. The cookie powder and the binder material were thoroughly mixed for a few minutes in a 50 mL beaker by a lab spatula, and then transferred into a load cell. The load cell was made of stainless steel and was ¾" in inner diameter and 2" in height. It was equipped with a top piston and a bottom piston; both of the pistons were ¾" in diameter and 1" in height. The load cell was compressed through the top and bottom pistons by a type-5582 Instron machine, with a loading rate of 0.3 mm/min. The maximum compression pressure was 350 MPa. After the first loading, the top piston was removed and the compressed material was transferred into a 50 mL beaker and broken apart by a lab spatula into aggregates having sizes below 100 µm. The mixture was placed back into the load cell and compressed again at the same loading rate and maximum pressure. The compacted material was kept in the load cell, with the pistons remaining in place but not compressed, and the mixture was cured and dried in a VWR (1330GM) box furnace at 100° C. in air for 24 hours.

After curing, the sample was removed from the load cell and cut into beam samples using an MTI high speed diamond cut-off saw. The sample surfaces were polished by 320 grit sand paper. The flexural strength was measured in a three-point bending setup on the type-5582 Instron machine, in the displacement control mode. The crosshead speed was set to 3.0 mm/min and the span length, L, was set to 19.05 mm. The flexural strength is defined as $R=(3/2)(P_{max}L/bd^2)$, where $P_{max}$ is the maximum load, b is the sample width, and d is the sample height. The average flexural strength was 3 MPa.

Example 16: Composite Material Fabrication with Foaming Agents

Foaming agents can be added into the filler material-binder material mixture to generate bubbles to adjust the binder material and filler material properties (e.g., the effective fluidity and volume of binder material, and/or the wettability of filler materials). In general, a variety of different foaming agents can be used, and can be added at various stages of the fabrication process (e.g., foaming agents can be added to start the foaming process before, during, or after the compression of the mixture).

Another composite material was produced, using the same sand and epoxy binder material as in Example 3. The foaming agent was toluenesulfonyl hydrazide (TSH), provided by Sigma-Aldrich (Product No. 132004). The resin and the hardener were first mixed thoroughly with a lab spatula in a 50 mL beaker, at a weight ratio of 5:1. Then, TSH was added into the resin-hardener mixture, and mixed with a lab spatula for 1 minute. The TSH was either 5 weight percent or 10 weight percent of the total binder material mass. After mixing, a small amount of epoxy-TSH mixture was added to 5 g of air-dried sand grains. The resin binder material content was 4 weight percent of the total weight. The sand grains and the resin binder material were thoroughly mixed for a few minutes in a 50 mL beaker by a lab spatula, and the resulting mixture was transferred into the same steel cell as in Example 3. The pressure application, curing, cutting, polishing, and flexural strength measurement procedures were the same as in Example 3. The applied pressure was 350 MPa. The samples with 5 weight percent TSH had an average flexural strength of 30 MPa; the samples with 10 weight percent TSH had an average flexural strength of 26 MPa.

Example 17: Non-Uniform Distribution of Binder Material

As discussed above, composite materials can be produced that can vary in composition at different locations within the material, for a variety of structural or functional applications. When the binder material includes a polymer, the polymer need not be uniformly distributed within the composite material. For example, critical load-carrying regions may have a higher local polymer binder material content, while regions where local loadings are relatively small may have lower local binder material content. Different sections of materials can be added and processed in a stepwise manner, in an additive manufacturing or 3D printing process. For example, a portion of a composite material can be added, compressed, and/or cured, before the next portion of material is added and processed.

Another composite material was prepared by mixing resin and hardener thoroughly with a lab spatula in a 50 mL beaker, at a weight ratio of 5:1. After mixing, a small amount of epoxy resin binder material-hardener mixture was deposited onto 5 g of air-dried soil grains.

The resin binder material content was 2 weight percent or 4 weight percent of the total weight for different batches. Each batch of soil-resin binder material mixture was thoroughly mixed for a few minutes in a 50 mL beaker by a lab spatula, and was transferred into a load cell. The load cell was made of stainless steel and was ¾" in inner diameter and 2" in height. It was equipped with a top piston and a bottom piston; both of the pistons were ¾" in diameter and 1" in height. The load cell was compressed through the top and bottom pistons by a type-5582 Instron machine, with a loading rate of 0.3 mm/min. The maximum compression pressure was 350 MPa. After the first loading, the top piston was removed and the compressed soil-resin binder material mixture was transferred into a 50 mL beaker, and broken apart by a lab spatula into small pieces. Next, the bottom one quarter volume of the load cell was filled with 1.25 g of soil-resin mixture of 4 weight percent resin binder material content; the soil-resin mixture was slightly condensed by the upper piston, by using the Instron machine under a pressure of 10 MPa. The upper piston was removed after compression. The middle half of the load cell was then filled with 2.5 g of soil-resin binder material mixture of 2 weight percent resin content, followed by slight compression by the upper piston, using the Instron machine under the pressure of 10 MPa. The upper piston was removed after compression. Finally, the top quarter of the load cell was filled by 1.25 g of soil-resin binder material mixture of 4 weight percent binder material content. The entire sample was compressed by the upper piston in the Instron machine, at the loading rate of 0.3 mm/min. The maximum compression pressure was 350 MPa. The compacted material was kept in the load cell and cured in a VWR-1330GM box furnace at 100° C. in air for one hour. After curing, the sample was removed from the load cell and cut into beam samples using an MTI high speed diamond cut-off saw. The sample surfaces were polished using 320 grit sand paper. The flexural strength was measured in a three-point bending setup on the type-5582 Instron machine, in the displacement control mode. The crosshead speed was set to 3.0 mm/min and the span length, L, was set to 19.05 mm. The flexural strength is defined as $R=(3/2)(P_{max}L/bd^2)$, where $P_{max}$ is the maximum load, h is the sample width, and d is the sample height. The average flexural strength was 22 MPa.

Example 18: Stented Processing of Composite Materials

As discussed above, the fabrication methods disclosed herein permit step-wise or segmented processing of mixtures of binder and filler materials to form composite materials. When pressure is applied to the mixtures, compaction can be performed section by section, step-by-step, area by area, or layer by layer. The compression pressure, rate, area, direction, and mode may vary in each operation. Different sections of materials can be added and processed step-by-step, in an additive manufacturing or three-dimensional printing process (i.e., a portion of material can be added, compressed, and/or cured, before next portion of material is added and processed).

Another composite material was produced, using the same soil and polymer binder material as in Example 4. The resin and the hardener were first mixed thoroughly with a lab spatula in a 50 mL beaker, at a weight ratio of 5:1. After mixing, a small amount of resin-hardener mixture was applied to 5 g of air-dried soil grains. The resin binder material content was 4 weight percent of the total weight, for different batches. The soil grains and the resin were thoroughly mixed for a few minutes in a 50 mL beaker by a lab spatula, and the resulting mixture was transferred into a load cell. The load cell was made of stainless steel and was ¾" in inner diameter and 2" in height. It was equipped with a top piston and a bottom piston; both of the pistons were ¾" in diameter and 1" in height. The load cell was quasi-statically compressed through the top and bottom pistons by a type-5582 Instron machine, with the loading rate of 0.3 mm/min. The maximum compression pressure was 350 MPa. After the first loading, the top piston was removed and the compressed material was transferred into a 50 mL beaker, broken apart by a lab spatula into small aggregates. A third of the mixture was placed back into the load cell and compressed again at the same loading rate but only to 200 MPa. After maintaining the pressure on the mixture for 2 minutes, the top piston was removed and another ⅓ of the mixture was placed into the load cell and compressed again at the same loading rate at 200 MPa. After maintaining the pressure for another 2 minutes, the top piston was removed again and the final ⅓ of the mixture was placed into the load cell and compressed at the same loading rate at 350 MPa. The compacted material was kept in the load cell and cured in a VWR-1330GM box furnace at 100° C. in air for one hour.

After curing, the composite material was removed from the load cell and cut into beam samples using an MTI high speed diamond cut-off saw. The composite material surfaces were polished using 320 grit sand paper. The flexural strength was measured in a three-point bending setup on the type-5582 Instron machine, in the displacement control mode. The crosshead speed was set to 3.0 mm/min and the span length, L, was set to 19.05 mm. The flexural strength is defined as $R=(3/2)(P_{max}L/bd^2)$, where $P_{max}$ is the maximum load, b is the sample width, and d is the sample height. The measured flexural strength was 25 MPa.

Example 19: Composite Materials with Inner or Surface Features

Another composite material was produced, using the same resin binder material and hardener as in Example 4. The binder material and hardener were first mixed thoroughly with a lab spatula in a 50 mL beaker, at a weight ratio of 5:1. After mixing, a small amount of resin-hardener mixture was added to 5 g of air-dried soil grains. The resin binder material content was 4 weight percent of the total weight. The soil grains and the resin were thoroughly mixed for a few minutes in a 50 mL beaker by a lab spatula, and the resulting mixture was transferred into a cylindrical load cell. The load cell was made of stainless steel, measuring ¾" in inner diameter, 2" in height, and 1" in outer diameter. It was equipped with a top piston and a bottom piston; both of the pistons were made of stainless steel, ¾" in diameter and 1" in height. The bottom piston was inserted in the cell, and the soil-resin binder material mixture was placed on top of the bottom piston, inside the steel cell. The top piston was compressed into the load cell by a type-5582 Instron machine and pressure was applied to the sand-resin binder material mixture, with a loading rate of 0.3 mm/min. The maximum compression pressure was 350 MPa. The compression time was 5 minutes. After the first loading, the top piston was removed and the compressed material was transferred into a 50 mL beaker, and broken apart by a lab spatula into small pieces.

Figure 24:
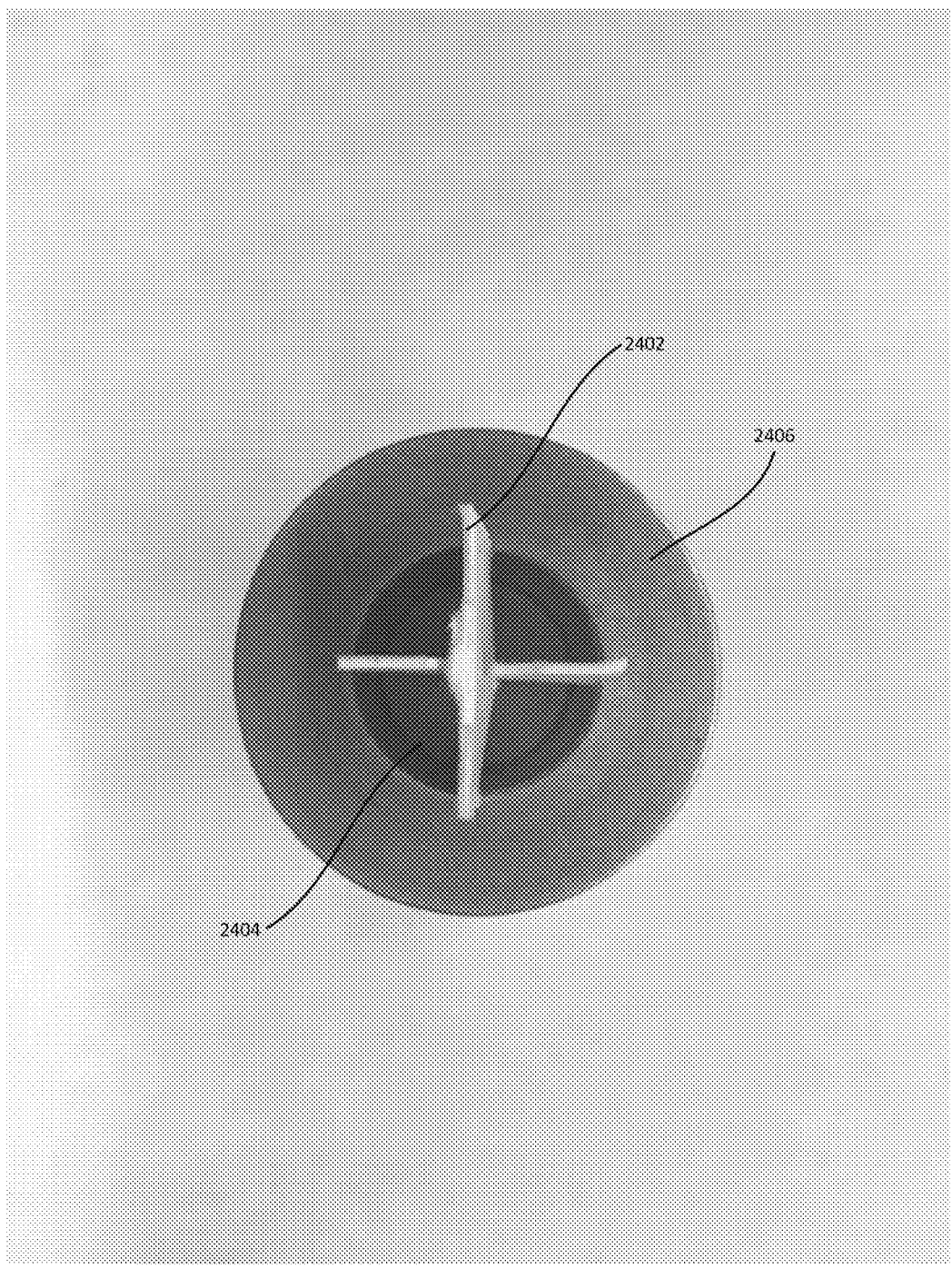
FIG. 24 is an image of a load cell that includes a divider.

FIG. 24 shows an image of the apparatus that was used to prepare the composite material. A divider 2402 was placed into the empty load cell 2406, on the bottom piston, 2404 as shown in FIG. 24. In general, the divider can have various shapes, according to the intended design of the inner features of the resulting composite material. The divider divided the load cell into different zones; each zone was filled with either a compressed soil-resin binder material mixture, or with air-dried soil without binder material. The mixture in each zone was compressed, with the same loading rate, maximum pressure, and compression time as was used with the first loading. The compacted material was kept in the load cell and cured in a VWR-1330GM box furnace at 100° C. in air for one hour.

After curing, the sample was removed from the load cell and put into a 50 mL beaker filled with water. The beaker and the material was then placed in a VWR-50HT ultrasonicator, and vibrated for 1 hour at 60 Hz. The regions with no resin binder material were removed during sonication. Zones that previously contained only filler material defined the voids 2502 of the resulting composite material, as shown in FIG. 25.

Example 20: Additional Filler Materials/Reinforcements

Another composite material was produced, using the same filler material, polymer binder material, and preparative procedures used in Example 4. The resin binder material and the hardener were first mixed thoroughly with a lab spatula in a 50 mL beaker, at a weight ratio of 5:1. Next, a small amount of resin-hardener mixture was added to 5 g of air-dried soil grains. The resin binder material content was 4 weight percent of the total weight. The soil grains and the resin binder material were thoroughly mixed for a few minutes in a 50 mL beaker by a lab spatula, and the resulting mixture was transferred into a cylindrical load cell. The load cell was made of stainless steel, measuring ¾" in inner diameter, 2" in height, and 1" in outer diameter. It was equipped with a top piston and a bottom piston; both of the pistons were made of stainless steel, measuring ¾" in diameter and 1" in height. The bottom piston was inserted in the cell, and the soil-resin binder material mixture was placed on top of the bottom piston, inside the steel cell. The top piston was compressed into the load cell by a type-5582 Instron machine and applied a pressure on the sand-resin binder material mixture, with the loading rate of 0.3 mm/min. The maximum compression pressure was 350 MPa. The compression time was 5 minutes. After the first loading, the top piston was removed and the compressed material was transferred into a 50 mL beaker, and broken apart by a lab spatula into small pieces. About 0.1 g of glass fibers, which were approximately 0.08 mm in diameter and approximately 1 mm in length, were added into the mixture and mixed thoroughly with a lab spatula. The soil-resin binder material mixture with glass fibers was then placed back into the load cell and compressed again, with the same loading rate, maximum pressure, and compression time as was used in the first loading. The compacted material was kept in the load cell and cured in a VWR-1330GM box furnace at 100° C. in air for one hour.

After curing, the material was removed from the load cell and cut into beam samples using an MTI high speed diamond cut-off saw. The sample surfaces were polished using 320 grit sand paper. The flexural strength measurement procedure was the same as in Example 4. The material had a measured flexural strength of 31 MPa.

Example 21: Sectioned Processing of Composite Materials

As discussed above, during fabrication of the composite materials, the mixture of binder and filler materials does not have to be compacted simultaneously. Further, composite materials produced according to the methods disclosed herein can be fabricated in stages rather than in a single pressurization step. Instead, pressure treatment can be performed section by section, step-by-step, area by area, or layer by layer. The compression pressure, rate, area, direction, and mode may vary in each operation. Different sections of materials can be added and processed step-by-step, in an additive manufacturing or three-dimensional printing process (i.e., a portion of material can be added, compressed, and/or cured, before the next portion of material is added and processed).

Figure 26:
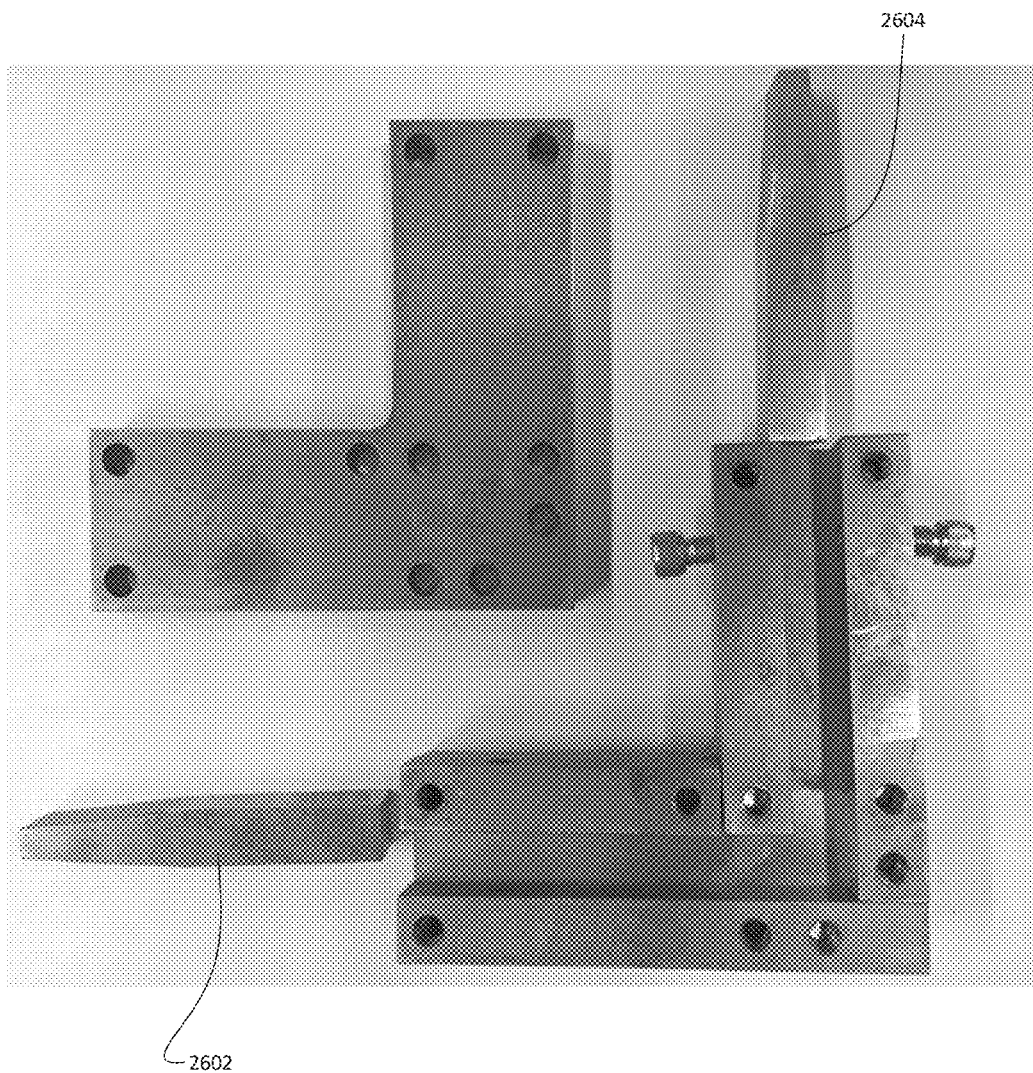
FIG. 26 is an image showing an example of an L-shaped load cell.

Another composite material was produced, using the same filler material and binder material used in Example 4. The resin and the hardener were first mixed thoroughly with a lab spatula in a 50 mL beaker, at a weight ratio of 5:1. After mixing, a small amount of resin-hardener mixture was deposited onto 8 g of air-dried soil grains. The resin binder material content was 4 weight percent of the total weight. The soil grains and the resin binder material were thoroughly mixed for a few minutes in a 50 mL beaker by a lab spatula, and the resulting mixture was transferred into an L-shaped load cell, as shown in FIG. 26, formed of hardened steel. The L-shaped load cell was 4 inches long on each side, with a hollow inner channel in the middle measuring 0.5" by 0.5". Two pistons were designed to fit the inner channel. The piston position could be fixed by loading pins during compression.

The soil-resin binder material mixture was compressed in the L-shaped load cell by a type-5582 Instron machine, through piston 2602. The position of the other piston 2604 was fixed. The loading rate was 0.3 mm/min. The maximum compression pressure was 350 MPa. After the peak pressure was reached and maintained for 5 minutes, piston 2602 was locked and fixed in place. The L-shaped load cell was flipped over, and material inside was compressed through piston 2604 with the same loading rate and maximum compression pressure. After holding the peak pressure for 5 minutes, the compacted material was kept in the load cell and cured in a VWR-1330GM box furnace at 100° C. in air for one hour.

After curing, the sample was removed from the L-shaped load cell and cut into beam samples using an MTI high speed diamond cut-off saw. The sample surfaces were polished using 320 grit sand paper. The flexural strength was measured in the same three-point bending setup as was used in Example 4. The composite material had a flexural strength of 30 MPa.

Example 22: Curing at Room Temperature

Another composite material was produced, using the same filler material as was used in Example 4. The epoxy resin binder material was the same as that used in Example 3, but the hardener was EPIKURE-3072 (obtained from Momentive). The resin binder material preparation, soil-resin premixing, compression, re-mixing, and re-compression process were the same as in Example 4. The compacted material was kept in the load cell and cured at room temperature in air for 1-7 days.

After curing, the composite material was removed from the load cell and cut into beam samples using an MTI high speed diamond cut-off saw. The sample surfaces were polished using 320 grit sand paper. The flexural strength measurement process was the same as that used in Example 4. The testing data showed that the material had a flexural strength of 8 MPa when the curing time was 24 hours. The flexural strength increased to 15 MPa when the curing time was 48 hours, and to 22 MPa when the curing time was 168 hours.

Example 23: Biomimicking Composite Materials

The methods disclosed herein can be used to fabricate biomimicking materials, including natural or man-made materials that contain a large amount of filler material and/or reinforcement components and a small amount of binder material.

A composite material was produced using calcium carbonate (provided by Acros Organics) as a filler material. The epoxy and the hardener were the same as those used in Example 4. The resin and the hardener were first mixed thoroughly with a lab spatula in a 50 mL beaker, at a weight ratio of 5:1. After mixing, a small amount of resin-hardener mixture was added onto 2.5 g of calcium carbonate. The resin binder material content was 15 weight percent of the total weight. The calcium carbonate and the resin binder material were premixed for a few minutes in a 50 mL beaker by a lab spatula. The first compression, re-mixing, second compression, curing, and testing procedures were the same as those used in Example 4. The maximum compression pressure was 350 MPa. The material, which may be viewed as an artificial nacre, had a flexural strength of 23 MPa.

Other Embodiments

A number of embodiments have been described. Nevertheless, it will be understood that various modifications may be made without departing from the spirit and scope of the disclosure. Accordingly, other embodiments are within the scope of the following claims.

What is claimed is:
1. A method of forming a composite material, the method comprising:
   forming a mixture comprising a binder material and a filler material; and
   applying a pressure of at least 20 MPa to the mixture to form the composite material,
   wherein the mixture comprises less than 9% by weight of the binder material, less than 18% by volume of the binder material, or both.
2. The method of claim 1, further comprising:
   breaking the composite material into a plurality of pieces; and
   applying a second pressure of at least 10 MPa to the plurality of pieces.
3. The method of claim 1, further comprising forming a pre-cast component comprising the composite material by:
   positioning the mixture in a mold having a shape conforming to a shape of the pre-cast component; and
   applying the pressure to the mixture in the mold.
4. The method of claim 1, wherein the application of pressure to the mixture comprises impacting the mixture with an impact member.
5. The method of claim 1, wherein applying the pressure to the mixture comprises translating a pressurizing member relative to the mixture to apply the pressure to different portions of the mixture at different times.
6. The method of claim 5, wherein the pressurizing member comprises a roller.
7. The method of claim 1, wherein the binder material comprises at least one material selected from the group consisting of polyesters, polyethersulfones, polysulfones, polyetherimides, epoxies, fluoropolymers, phenolic materials, vinyl esters, carboxymethylcellulose-based materials, polyetherketones, cyclic oligomers, polymethyl methacrylates, polycarbonates, and polybutylene terephthalates.

8. The method of claim 1, wherein the filler material comprises at least one material selected from the group consisting of sand, soil, rocks, gravel, stones, bricks, metals, alloys, ceramics, polymers, composites, glasses, solid waste, medicine, food, carbon materials, electrode materials, and components thereof.

9. The method of claim 1, wherein the mixture comprises at least one additive selected from the group consisting of foaming agents, bubble-generating agents, solvents, and lubricants.

10. The method of claim 1, comprising heating the composite material to a temperature of at least 50° C.

11. The method of claim 1, comprising applying the pressure to the mixture by contacting the mixture with a compressive load.

12. The method of claim 11, wherein the pressure is applied to the mixture for a duration of at least 1 second.

13. The method of claim 1, further comprising applying a second pressure of at least 10 MPa to the mixture.

14. The method of claim 13, wherein each application of pressure to the mixture occurs for a duration of 1 second or less.

15. The method of claim 13, wherein during each application of pressure to the mixture, the pressure applied to the mixture increases from zero to a maximum pressure in a time period of 100 microseconds or less.

16. The method of claim 5, wherein the pressurizing member comprises a piston.

17. The method of claim 1, wherein the mixture comprises less than 3% by weight of the binder material.

18. The method of claim 1, wherein the mixture comprises less than 10% by volume of the binder material.

19. The method of claim 1, wherein the binder material comprises at least one material selected from the group consisting of thermoplastic materials, thermosetting materials, elastomeric materials, polymer materials, ceramic materials, glasses, carbon materials, metals, alloys, salts, and sulfur-containing materials.

20. The method of claim 1, wherein the filler material comprises units of one or more materials in the form of at least one of powders, beads, dots, grains, particles, chips, cubes, layers, layer stacks, blocks, spheres, fibers, tubes, beams, pipes, rods, threads, platelets, coatings, hollow beads, hollow fibers, hollow blocks, hollow layers, bilayers, porous materials, meshes, fabrics, mats, honeycombs, and three-dimensional forms.

21. The method of claim 1, wherein the pressure applied to the mixture to form the composite material is at least 30 MPa.

\* \* \* \* \*